United States Patent
Sung et al.

(10) Patent No.: US 10,262,203 B2
(45) Date of Patent: Apr. 16, 2019

(54) METHOD FOR RECOGNIZING IRIS AND ELECTRONIC DEVICE THEREFOR

(71) Applicant: SAMSUNG ELECTRONICS CO., LTD., Suwon-si, Gyeonggi-do (KR)

(72) Inventors: Woon-Tahk Sung, Seoul (KR); Young-Kwon Yoon, Seoul (KR); Taek-Seong Jeong, Suwon-si (KR); Moon-Soo Kim, Seoul (KR); Tae-Ho Kim, Cheongju-si (KR); Ki-Huk Lee, Suwon-si (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 0 days.

(21) Appl. No.: 15/505,741

(22) PCT Filed: Sep. 2, 2014

(86) PCT No.: PCT/KR2014/008171
§ 371 (c)(1),
(2) Date: Feb. 22, 2017

(87) PCT Pub. No.: WO2016/035901
PCT Pub. Date: Mar. 10, 2016

(65) Prior Publication Data
US 2017/0277950 A1    Sep. 28, 2017

(51) Int. Cl.
*G06K 9/00* (2006.01)
*G06K 9/20* (2006.01)
(Continued)

(52) U.S. Cl.
CPC ........... *G06K 9/00617* (2013.01); *G06K 9/00* (2013.01); *G06K 9/0061* (2013.01);
(Continued)

(58) Field of Classification Search
CPC .. G06K 9/00617; G06K 9/00; G06K 9/00597; G06K 9/00604; G06K 9/0061;
(Continued)

(56) References Cited

U.S. PATENT DOCUMENTS 6,731,307 B1   5/2004   Strubbe et al.
9,875,551 B2*  1/2018   Sung ..................... G06T 7/20
(Continued)

FOREIGN PATENT DOCUMENTS

EP   1 672 916    6/2006
JP   2004-261515  9/2004
(Continued)

OTHER PUBLICATIONS

International Search Report for PCT/KR2014/008171, dated May 21, 2015, 3 pages.
Written Opinion of the ISA for PCT/KR2014/008171, dated May 21, 2015, 5 pages.

*Primary Examiner* — Gregory M Desire
(74) *Attorney, Agent, or Firm* — Nixon & Vanderhye, P.C.

(57) ABSTRACT

Various embodiments of the present invention relate to a device and method for controlling iris recognition parameters in an electronic device. Here, the electronic device may comprise a processor for: identifying an iris recognition environment using an image sensor module for acquiring an image, a light emitting module for emitting an infrared ray, and input information of the electronic device; modifying at least one iris recognition parameter on the basis of the iris recognition environment; emitting an infrared ray through the light emitting module on the basis of the modified iris recognition parameter; and performing iris recognition using an image acquired by the image sensor module. Various other embodiments are also possible.

18 Claims, 26 Drawing Sheets

(51) Int. Cl.
*H04N 1/00* (2006.01)
*G06K 9/22* (2006.01)
*H04N 5/225* (2006.01)
*H04N 5/235* (2006.01)
*H04N 5/353* (2011.01)

(52) U.S. Cl.
CPC ..... *G06K 9/00597* (2013.01); *G06K 9/00604* (2013.01); *G06K 9/20* (2013.01); *G06K 9/2018* (2013.01); *G06K 9/228* (2013.01); *H04N 1/00307* (2013.01); *H04N 5/2256* (2013.01); *G06K 9/2027* (2013.01); *H04N 5/2354* (2013.01); *H04N 5/3532* (2013.01)

(58) Field of Classification Search
CPC ........ G06K 9/20; G06K 9/2018; G06K 9/228; G06K 9/2027; H04N 1/00307; H04N 5/2256; H04N 5/2354; H04N 5/3532
See application file for complete search history.

(56) References Cited

U.S. PATENT DOCUMENTS

| | | | |
|---|---|---|---|
| 2010/0074478 A1 | 3/2010 | Hoyos et al. | |
| 2013/0088583 A1 | 4/2013 | Northcott et al. | |
| 2013/0162799 A1 | 6/2013 | Hanna et al. | |
| 2013/0293457 A1* | 11/2013 | Yoon | G06F 3/011 |
| | | | 345/156 |
| 2016/0270656 A1* | 9/2016 | Samec | A61B 3/085 |
| 2017/0185839 A1* | 6/2017 | Kim | G06K 9/20 |
| 2017/0277950 A1* | 9/2017 | Sung | G06K 9/00617 |

FOREIGN PATENT DOCUMENTS

| | | |
|---|---|---|
| JP | 2012-160978 | 8/2012 |
| KR | 10-2004-0081895 | 9/2004 |
| KR | 10-2006-0090665 | 8/2006 |
| KR | 10-2012-0038755 | 4/2012 |
| WO | WO 2011/019192 | 2/2011 |

* cited by examiner

METHOD FOR RECOGNIZING IRIS AND ELECTRONIC DEVICE THEREFOR

CROSS-REFERENCE TO RELATED APPLICATION

This application is the U.S. national stage of International Application No. PCT/KR2014/008171, filed on Sep. 2, 2014, which designated the United States. The entire contents of this application are incorporated herein by reference.

TECHNICAL FIELD

Various embodiments of the present invention relate to a device and method for recognizing an iris in an electronic device.

BACKGROUND ART

With the development of information and communication technologies and semiconductor technologies, various types of electronic devices have developed into multimedia devices that provide various multimedia services. For example, an electronic device may provide multimedia services, such as a voice communication service, a video communication service, a messenger service, a broadcast service, a wireless Internet service, a camera service, and a music reproduction service.

An electronic device stores a user's personal information so that a security function can be provided in order to prevent personal information from being indiscriminately used by other users. For example, an electronic device can authenticate a user through an iris recognition service.

DETAILED DESCRIPTION OF THE INVENTION

Technical Problem

An electronic device may emit infrared light through a light emitting module and detect the infrared light reflected from a user's iris, so as to perform iris recognition. However, when infrared light of an outdoor environment is strong or infrared light is generated by an incandescent lamp, an error in iris recognition may occur due to surrounding infrared light in the electronic device.

In addition, since the electronic device emits infrared light of consistent intensity in order to recognize an iris, when a user is adjacent to the light emitting module, a user's eye may be damaged.

An embodiment of the present invention may provide a device and method for controlling an iris recognition parameter (e.g., an infrared light emission time or an exposure time) so as to correspond to the surrounding environment in an electronic device.

An embodiment of the present invention may provide a device and method for controlling an iris recognition parameter (e.g., an infrared light emission time or an infrared light emission intensity) based on a distance from a user in an electronic device.

An embodiment of the present invention may provide a device and method for controlling an iris recognition parameter (e.g., an infrared light emission intensity) based on a position of an iris in an electronic device.

An embodiment of the present invention may provide a device and method for controlling the sensitivity of an image sensor based on an infrared light emission intensity in an electronic device.

Solution to Problem

According to an embodiment of the present invention, an electronic device may include: an image sensor module configured to obtain an image; a light emitting module configured to emit infrared light; and a processor configured to identify an iris recognition environment using input information of the electronic device, change at least one iris recognition parameter based on the iris recognition environment, emit infrared light through the light emitting module based on the changed iris recognition parameter, and perform iris recognition using an image obtained through the image sensor module.

According to an embodiment of the present invention, a method of an electronic device may include: identifying an iris recognition environment using at least one input information of the electronic device; changing at least one iris recognition parameter based on the iris recognition environment; emitting infrared light based on the changed iris recognition parameter; and performing iris recognition using an image obtained through an image sensor module.

Advantageous Effects

An electronic device according to various embodiments of the present invention controls an iris recognition parameter (e.g., an infrared light emission time or an exposure time) to correspond to the surrounding environment, so that iris recognition can be performed adaptively to the surrounding environment.

An electronic device according to various embodiments of the present invention controls an iris recognition parameter (e.g., an infrared light emission time or an infrared light emission intensity) based on a distance from a user, so that the safety of a user's eye can be ensured during iris recognition.

An electronic device according to various embodiments of the present invention controls an iris recognition parameter (e.g., an infrared light emission intensity) based on a position of an iris and controls the sensitivity of an image sensor based on an infrared light emission intensity, so that the power consumption of the electronic device can be reduced.

BEST MODE FOR EMBODYING THE INVENTION

Figure 1A:
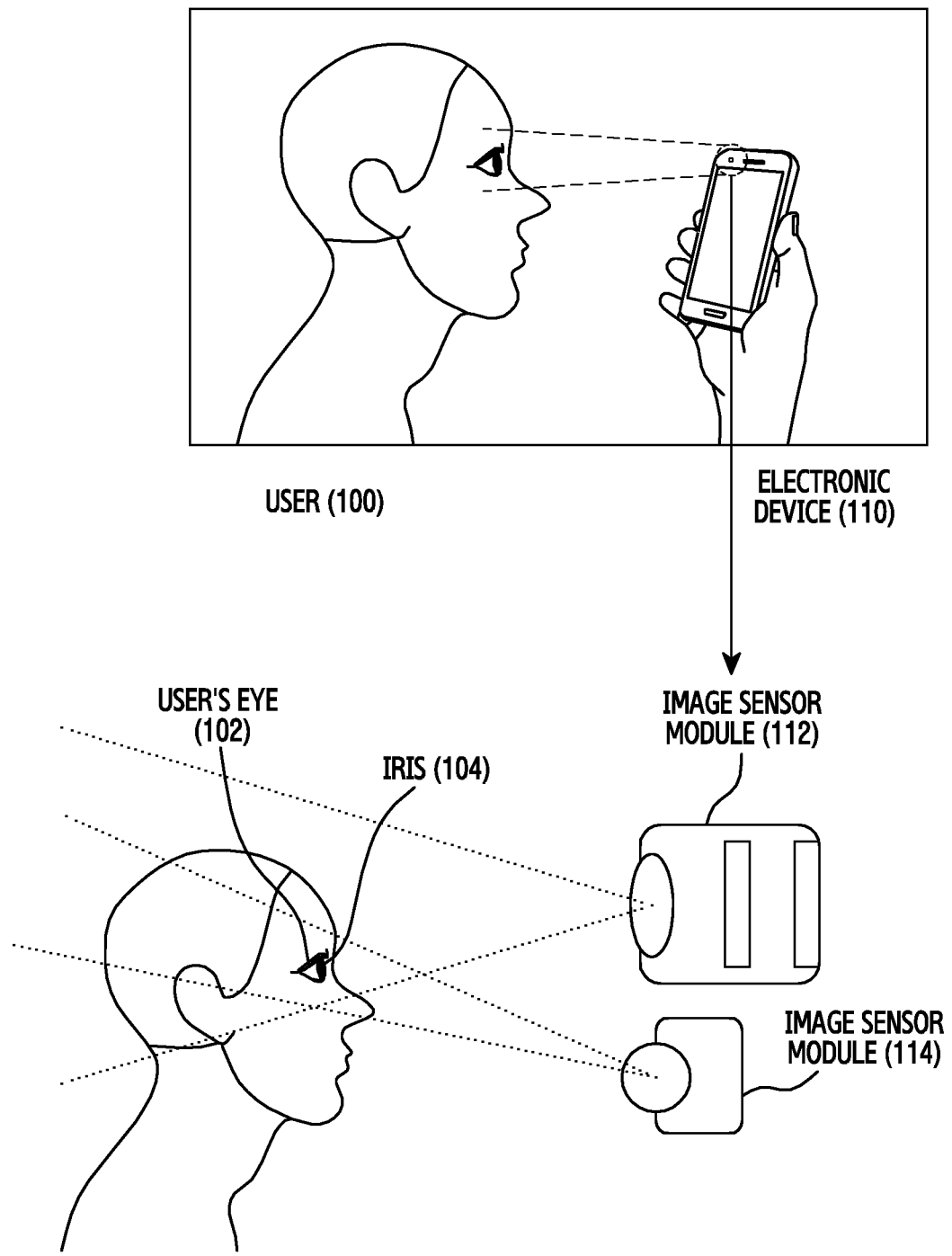
FIGS. 1A to 1C illustrate a configuration for iris recognition according to an embodiment of the present invention.

Hereinafter, various embodiments of the present invention will be described with reference to the accompanying drawings. However, it should be understood that the various embodiments of the present invention are not limited to specific embodiments and include various modifications, equivalents, and/or alternatives thereof. In connection with descriptions of the drawings, like reference numerals designate like elements.

As used herein, the expression "have", "may have", "include", or "may include" refers to the existence of a corresponding feature (e.g., numeral, function, operation, or constituent element such as component), and does not exclude one or more additional features.

Throughout the specification, the expressions "A or B," "at least one of A or/and B," "one or more of A or/and B," and the like may include all combinations of the listed items. For example, "A or B," "at least one of A and B," or "at least one of A or B" may refer to all cases of (1) including at least one A, (2) including at least one B, or (3) including both at least one A and at least one B.

The expressions "a first," "a second," "the first," "the second," and the like, used in various embodiments, may modify various elements irrespective of order and/or importance thereof and do not limit the corresponding elements. The above-described expressions may be used to distinguish an element from another element. For example, a first user device and a second user device indicate different user devices although both of them are user devices. For example, a first element may be termed a second element, and similarly, a second element may be termed a first element without departing from the scope of the present invention.

It should be understood that when an element (e.g., first element) is referred to as being (operatively or communicatively) "connected," or "coupled," to another element (e.g., second element), it may be directly connected or directly coupled to the other element or any other element (e.g., third element) may be interposed between them. In contrast, it may be understood that when an element (e.g., first element) is referred to as being "directly connected," or "directly coupled" to another element (second element), there are no elements (e.g., third element) interposed between them.

The expression "configured (or set) to", used in this specification, may be interchangeably used with, for example, "suitable for," "having the capacity to," "designed to," "adapted to," "made to," or "capable of" according to circumstances. The term "configured (or set) to" may not necessarily mean "specifically designed to" in hardware. Instead, in some cases, the expression "device configured to" may mean that the device "can ~" together with other devices or components. For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical terms and scientific terms, may have the same meaning as commonly understood by a person of ordinary skill in the art to which the present invention pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, even the term defined in the present invention should not be interpreted to exclude embodiments of the present invention.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

In some embodiments, an electronic device may be a smart home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or an Internet of Things device (e.g., a light bulb, various sensors, electricity or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electricity meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present invention is not limited to the aforementioned devices, and may include a new electronic device according to the development of technology Hereinafter, an electronic device according to various embodiments will be described with reference to the accompanying drawings. In the present invention, the term "user" may indicate a person using an electronic device or a device (e.g., an artificial intelligence electronic device) using an electronic device.

Hereinafter, in various embodiments of the present invention, a technology for controlling an iris recognition parameter for iris recognition in an electronic device will be described. For example, an iris recognition parameter may include at least one of an infrared light emission time, an infrared light emission intensity, and an exposure time.

Figure 1B:
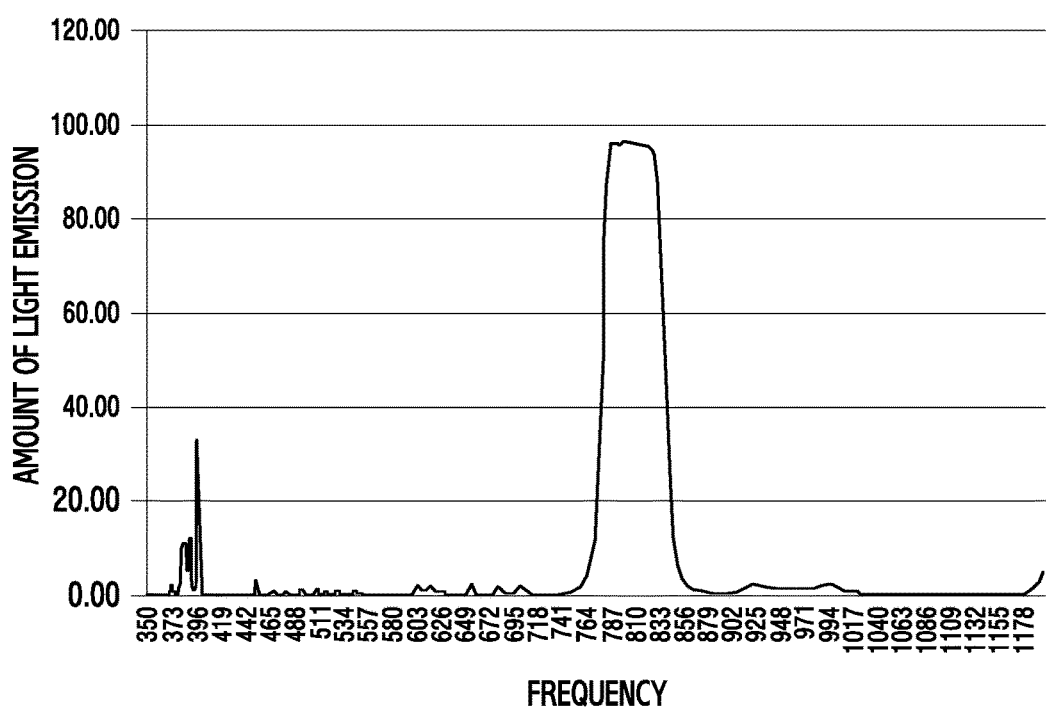
Figure 1C:
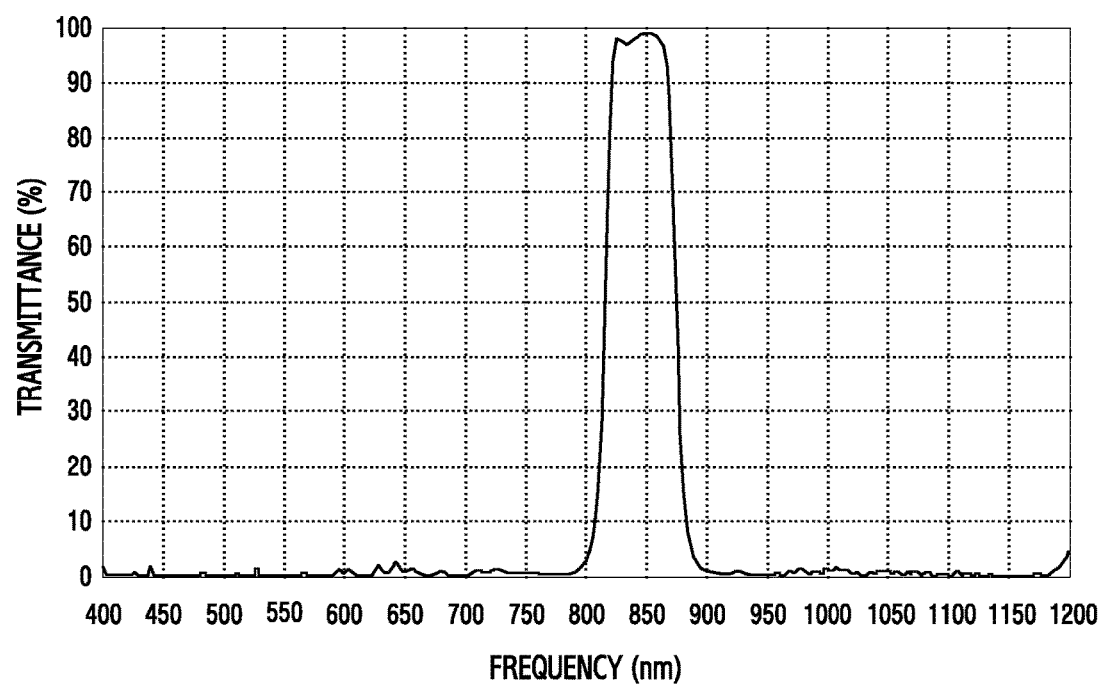

FIGS. 1A to 1C illustrate a configuration for iris recognition according to an embodiment of the present invention.

Referring to FIGS. 1A to 1C, when an iris recognition service is provided, an electronic device 110 may emit infrared light in a direction toward a user 100 by using an infrared emitting module (Infrared Emitting Diode; IRED) 114, which is functionally connected thereto as shown in FIG. 1A. For example, the electronic device 110 may emit infrared light of a specific frequency band (e.g., a wavelength band of ±50 nm with reference to the center frequency of a wavelength of 850 nm) as shown in FIG. 1B.

The electronic device 110 may perform iris recognition by using the infrared light reflected from an iris of the user 100, sensed through an image sensor module 112 which is functionally connected thereto. For example, the image sensor module 112 may include a band-pass filter, through which a light in a frequency band (for example, a wavelength band of ±50 nm with reference to the center frequency of a wavelength of 850 nm), in which the infrared emitting module 114 emits infrared light as shown in FIG. 1C among infrared lights which have been detected by a lens, can pass. Here, the image sensor module 112 may be referred to as a camera module.

According to an embodiment, as described in FIG. 1A, the electronic device 110 may include an image sensor module 112 and an infrared emitting module 114 in a direction in which a display is placed (a front surface).

According to an embodiment, the electronic device 110 may include an image sensor module 112 and an infrared emitting module 114 in a direction opposite to a direction in which a display is placed (a back surface).

When iris recognition is performed in an outdoor environment or an indoor environment in which an incandescent lamp is on, infrared light emitted from the infrared emitting module 114 of the electronic device 110 may be relatively too weak to reach an iris of a user due to the influence of infrared light caused by sunlight or an incandescent lamp, or the image sensor module 112 may not accurately detect infrared light reflected from an iris of a user, so that an error in iris recognition may occur. For example, when the electronic device 110 controls exposure in a rolling shutter scheme, an error in iris recognition may occur since the electronic device 110 controls an exposure time and a light emission time as described in FIG. 2 below.

Figure 2:
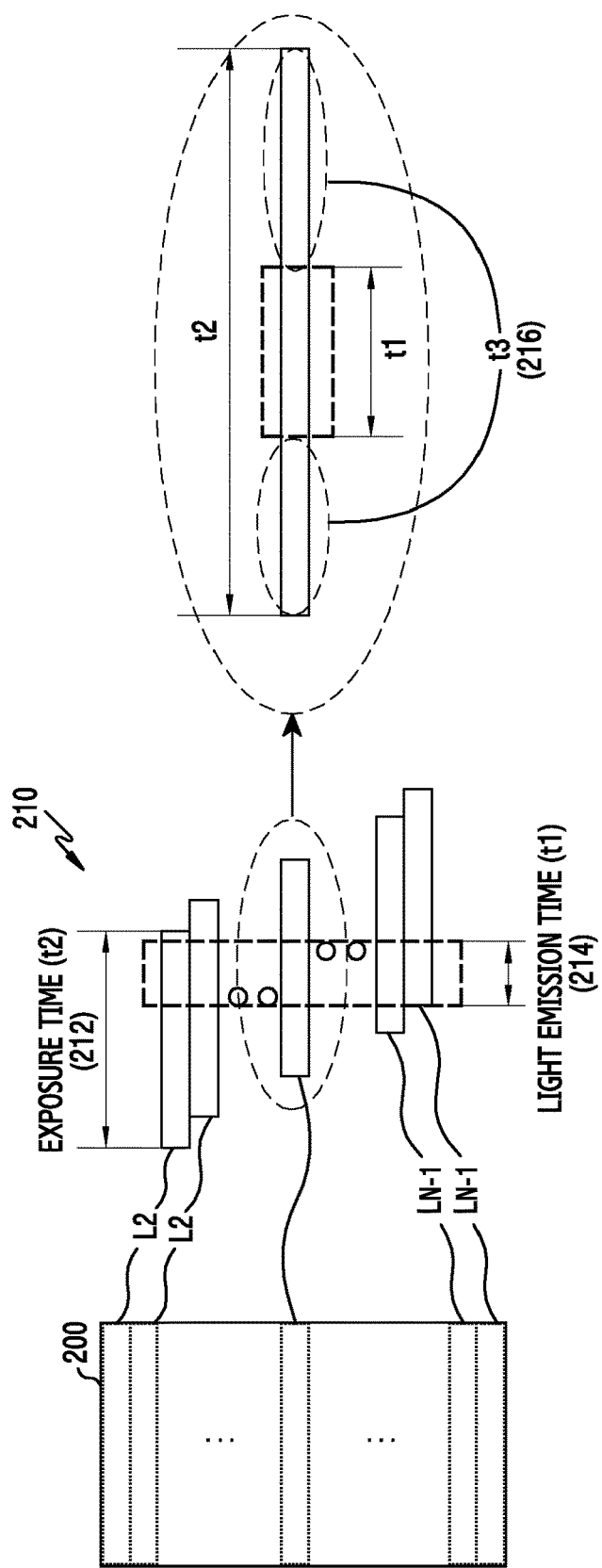
FIG. 2 illustrates an exposure time and a light emission time for iris recognition according to an embodiment of the present invention.

FIG. 2 illustrates an exposure time and a light emission time for iris recognition according to an embodiment of the present invention.

Referring to FIG. 2, the image sensor module 112 of the electronic device 110 may include an image sensor 200 including a plurality of pixels.

The electronic device 110 may classify the pixels of the image sensor 200 according to a plurality of lines (e.g., L1 to Ln) and control the lines included in the image sensor 200 to sequentially obtain images (210). For example, each line included in the image sensor 200 may be exposed during an exposure time (t2) 212 in order to obtain information on an image. According to an embodiment, a time difference as long as an offset (e.g., line lead-out time) may occur between exposure of a first pixel included in an L1 line and exposure of a first pixel included in an L2 line. Here, exposure of each line included in the image sensor 200 may indicate a series of operations that receive an external light during an exposure time (t2) in order to obtain information on an image.

The electronic device 110 may emit infrared light for iris recognition through the infrared emitting module 114 during a light emission time (t1) 214 that overlaps with the entire exposure time of the lines. According to an embodiment, the electronic device 110 may configure a light emission time to include a central area of the entire exposure time (e.g., from an exposure time point of a first pixel of an L1 line to an exposure time point of the last pixel of an Ln line) of the lines.

According to an embodiment, when the light emission time (t1) is smaller than the exposure time (t2) of the line, the middle line may be exposed due to an external light, such as sunlight or an electric lamp light, which is not infrared light emitted by the infrared emitting module 114 and then reflected from an iris, during a remaining section (t3) 216 excluding the light emission time (t1).

According to an embodiment, when iris recognition is performed in an environment which has a lot of infrared components due to sunlight or an incandescent lamp, an error in iris recognition may occur since the electronic device 110 obtains an image in which infrared component is saturated by a large amount of incident infrared light due to an external light during the remaining section (t3). Accordingly, the electronic device 110 may set an infrared light emission time (t1) in an environment which has a large amount of infrared components (e.g., outdoors) to be relatively longer than in an environment which has a small amount of infrared components (e.g., indoors). Additionally, the electronic device 110 may set the exposure time (t2) of the line in an environment which has a large amount of infrared components (e.g., outdoors) to be relatively shorter than in an environment which has a small amount of infrared components (e.g., indoors).

Figure 3:
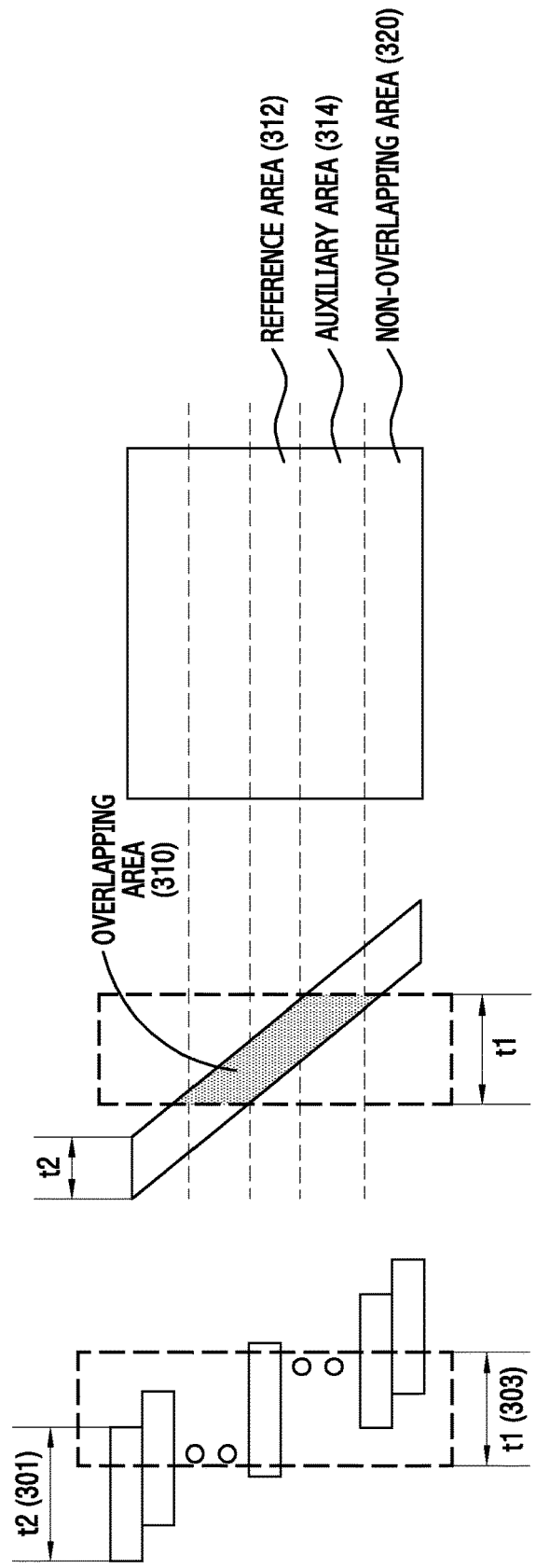
FIGS. 3A to 3C illustrate an exposure time and a light emission time for iris recognition in an outdoor environment according to an embodiment of the present invention.

FIGS. 3A to 3C illustrate an exposure time and a light emission time for iris recognition in an outdoor environment according to an embodiment of the present invention.

Referring to FIG. 3A, in order to prevent an infrared component from being saturated by an external light in an environment which has a large number of infrared components (e.g., outdoors), the electronic device 110 may set an exposure time (t2) 301 of a line to be shorter and a light emission time (t1) 303 to be longer than in an environment which has a small amount of infrared components (e.g., indoor). In this case, since an exposure time (t2−t1), obtained by excluding the light emission time, and an exposure time (t2) 301 of the line decrease, the electronic device 110 may prevent the infrared component from being saturated by the external light so as to provide iris recognition service.

According to an embodiment, when exposure of lines is controlled in a rolling shutter scheme, the total exposure time of lines included in an image sensor may be schematized as shown in FIG. 3B. The electronic device 110 may set the light emission time (t1) to include the central area of the total exposure time of the lines. The electronic device 110 may perform iris recognition by configuring, as a reference area 312, at least one line of an overlapping area 310 in which the exposure time of the lines and the light emission time are overlapped (e.g., a line including the total light emission time). Additionally, the electronic device 110 may set a line including at least a part of the light emission time as an auxiliary area 314, thereby using the auxiliary area 314 together with the reference area 312 to perform iris recognition.

According to an embodiment, when the iris recognition is performed in an environment which has a small amount of infrared components due to an external light (e.g., indoors), the electronic device 110 may set the light emission time (t1) to be relatively longer than in an environment which has a large amount of infrared components (e.g., outdoors) since the influence of infrared component due to the external light is small. Additionally, the electronic device 110 may set the exposure time (t2) of the line in an environment which has a small amount of infrared components (e.g., indoors) to be relatively longer than in an environment which has a large amount of infrared components (e.g., outdoors).

Figure 4:
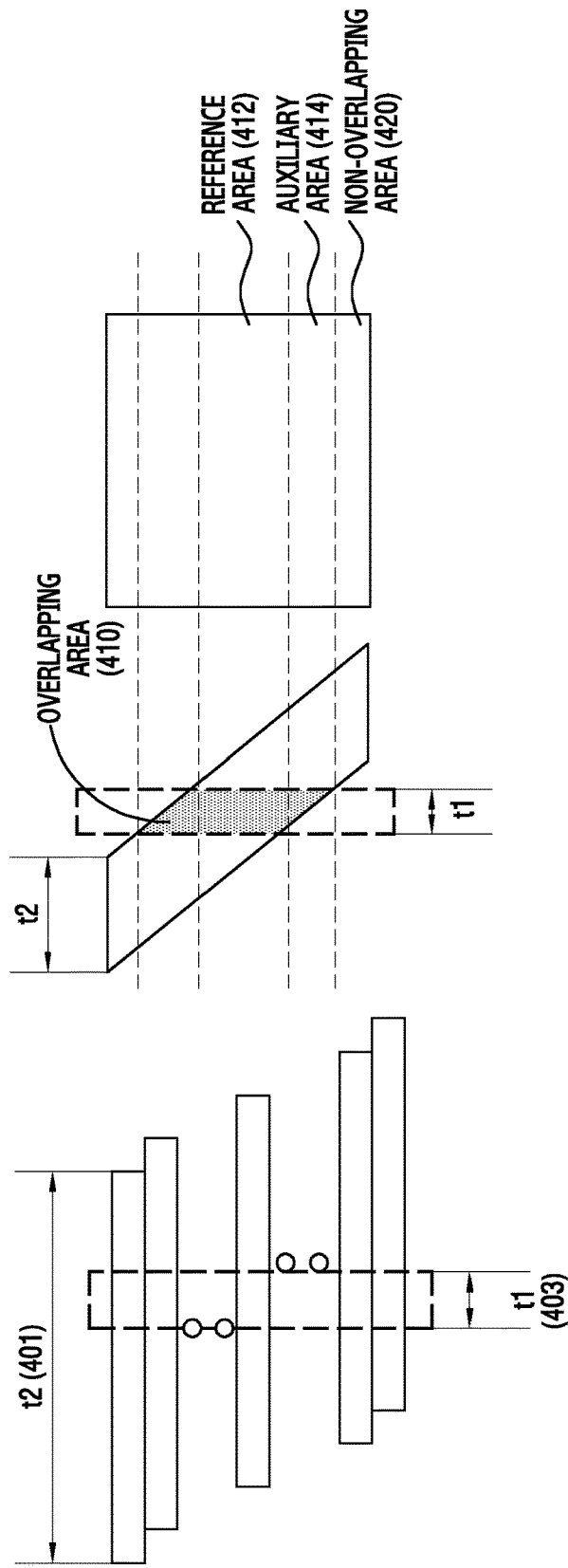
FIGS. 4A to 4C illustrate an exposure time and a light emission time for iris recognition in an indoor environment according to an embodiment of the present invention.

FIGS. 4A to 4C illustrate an exposure time and a light emission time for iris recognition in an indoor environment according to an embodiment of the present invention.

Referring to FIG. 4A, since the influence of infrared light due to an external light is small in an environment which has a small amount of the infrared components (e.g., indoors), the electronic device 110 may set an exposure time (t2) 401 of a line to be longer and a light emission time (t1) 403 to be shorter than in an environment which has a large amount of infrared components (e.g., outdoors). In this case, the electronic device 110 reduces the light emission time (t1), thereby preventing a blur caused by the shaking of the electronic device. Additionally, the electronic device 110 reduces the light emission time (t1), thereby reducing the power consumption by the infrared light emission, increasing the service life of an infrared emitting module, and maintaining the stability to a user's eye.

According to an embodiment, when exposure of lines is controlled in a rolling shutter scheme, the total exposure time of lines included in an image sensor may be schematized as shown in FIG. 4B. The electronic device 110 may set the light emission time (t1) to include the central area of the total exposure time of the lines. The electronic device 110 increases the exposure time of the line and reduces the light emission time so as to widen a reference area 412 for iris recognition and reduce a non-overlapping area 420, thereby efficiently performing iris recognition.

Figure 5:
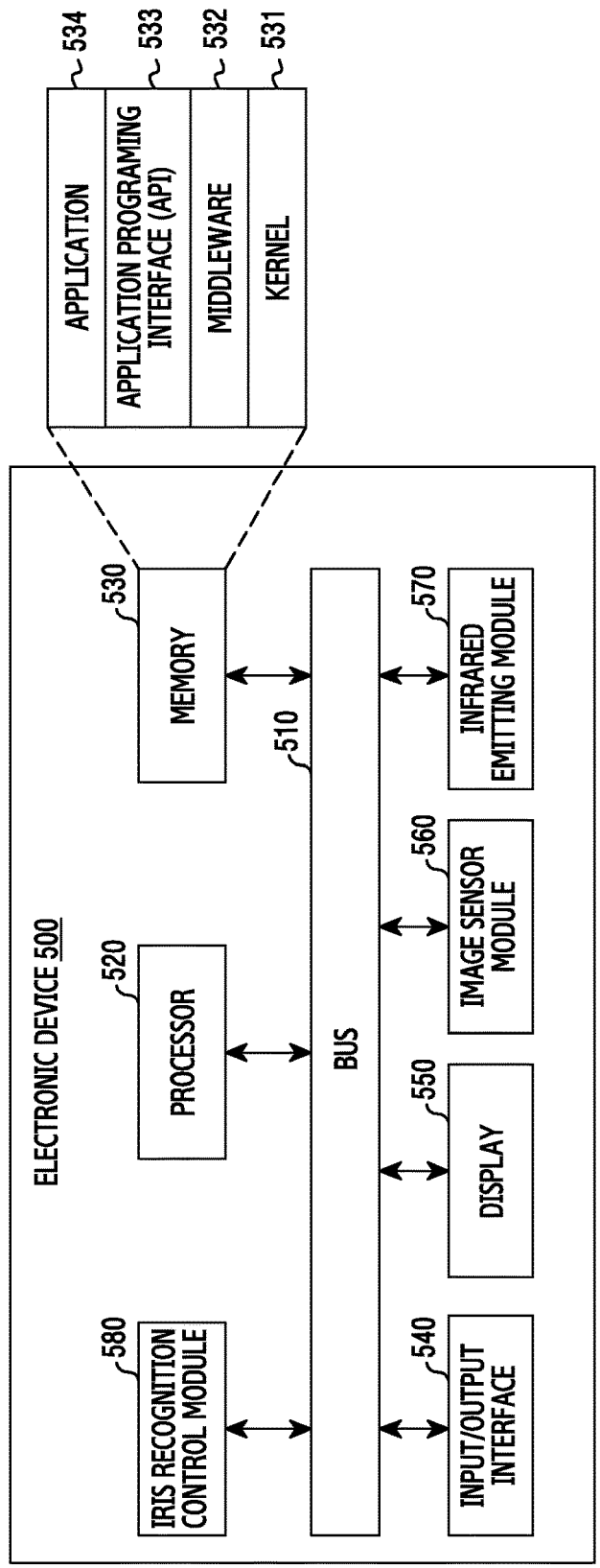
FIG. 5 illustrates a block diagram of an electronic device according to an embodiment of the present invention.

FIG. 5 is a block diagram of an electronic device according to an embodiment of the present invention. In the following description, an electronic device 500 may refer to the electronic device 110 of FIG. 1.

Referring to FIG. 5, the electronic device 500 may include a bus 510, a processor 520 (e.g., including processing circuitry), a memory 530, an input/output interface 540 (e.g., including input/output circuitry), a display 550 (e.g., including display circuitry), an image sensor module 560 (e.g., including image sensor circuitry), an infrared emitting module 570 (e.g., including infrared emitting circuitry), and an iris recognition control module 580 (e.g., iris recognition control circuitry). According to some embodiments, the electronic device 500 may omit at least one of the elements or further include other elements.

The bus 510 may connect the elements described above (e.g., the processor 520, the memory 530, the input/output interface 540, the display 550, the image sensor module 560, the infrared emitting module 570, or the iris recognition control module 580, etc.) to each other and may be a circuit which transmits communication (e.g., a control message) between the elements described above.

The processor 520 may include one or more of a Central Processing Unit (CPU), an Application Processor (AP), and a Communication Processor (CP). The processor 520, for example, may carry out operations or data processing relating to the control and/or communication of at least one other element of the electronic device 500. For example, the processor 520 may perform iris recognition using image information collected through the image sensor module 560 during the light emission time, based on a control of the iris recognition control module 580.

The memory 530 may include a volatile memory and/or a non-volatile memory.

The memory 530 may store a command or data (for example, iris information of a user) related to one or more other elements of the electronic device 500. According to an embodiment, the memory 530 may store software and/or a program. For example, the program may include a kernel 531, a middleware 532, an Application Programming Interface 533, or an application program 534. At least some of the kernel 531, the middleware 532, and the Application-program Programming Interface (API) 533 may be referred to as an Operating System (OS).

The kernel 531 may control or manage system resources (for example, the bus 510, the processor 520, and the memory 530) used for executing an operation or a function implemented in other programs (for example, the middleware 532, the API 533, and the application program 534). The kernel 531 may provide an interface through which the middleware 532, the API 533, or the application programs 534 may access individual elements of the electronic device 500 to control or manage the system resources.

The middleware 532 may function as a relay to enable the API 533 or the application programs 534 to communicate with the kernel 531 for data exchange. The middleware 532 may perform a control over a task request received from the application programs 534. For example, the middleware 532 may perform a control (e.g., scheduling or load balancing) over a task request by using a method such as assigning a priority, in which a system resource (e.g., the bus 510, the processor 520, or the memory 530) of the electronic device 500 can be used, to at least one application program of application programs 534.

The API 533 may include an interface or a function (for example, a command) for enabling the application program 534 to control a function provided by the kernel 531 or the middleware 532. For example, the API 533 may include at least one interface such as a file control, a window control, an image processing control, or a text control.

The input/output interface 540 may function as an interface that may transfer instructions or data input from a user or another external device to the other element(s) of the electronic device 500. Furthermore, the input/output interface 540 may output instructions or data, which are received from the other element(s) of the electronic device 500, to the user or the external device.

The display 550 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 550 may display, for example, various types of contents (for example, text, images, videos, icons, symbols, etc.) for a user. The display 550 may include a touch screen and may receive, for example, a touch, gesture, proximity, or hovering input using an electronic pen or the user's body part.

The image sensor module 560 may provide an image acquired by photographing a subject to the processor 520. For example, the image sensor module 560 may include a lens for receiving light for iris input of a user, a band-pass filter which allows a signal of a specific frequency band (e.g., a frequency band in which the infrared emitting module 570 emits infrared light) to pass therethrough, and an image sensor that converts an output signal of the band-pass filter into a digital signal and then outputs the digital signal.

According to an embodiment, the image sensor module 560 may expose each line in a rolling shutter scheme during an exposure time determined by the iris recognition control module 580. The image sensor module 560 may adjust the sensitivity of the image sensor to correspond to a light emission intensity of the infrared emitting module 570 based on a control of the iris recognition control module 580.

The infrared emitting module 570 may emit infrared light for iris recognition. For example, the infrared emitting module 570 may include a light emitting unit which emits infrared light and a light emission control unit (driver) which controls the light emitting unit.

According to an embodiment, the infrared emitting module 570 may emit infrared light during a light emission time determined by the iris recognition control module 580. Additionally, the infrared emitting module 570 may emit infrared light at the light emission intensity determined by the iris recognition control module 580.

The iris recognition control module 580 may control iris recognition using at least some of information obtained by other elements (e.g., the processor 520, the memory 530, the image sensor module 560, or the like).

According to an embodiment, the iris recognition control module 580 may identify an iris recognition environment (e.g., indoor or outdoor environment) by using information provided from other elements. The iris recognition control module 580 may determine at least one of an exposure time of the image sensor module 560 or a light emission time of the infrared emitting module 570 to correspond to the iris recognition environment.

According to an embodiment, the iris recognition control module 580 may estimate a distance from a user using information provided from other elements. The iris recognition control module 580 may determine at least one of a light emission time and an infrared light emission intensity of the infrared emitting module 570 to correspond to the distance from the user. Additionally, the iris recognition control module 580 may determine an exposure sensitivity of the image sensor module 560 to correspond to the infrared light emission intensity of the infrared emitting module 570.

According to an embodiment, the iris recognition control module 580 may determine an infrared light emission intensity of the infrared emitting module 570 to correspond to a position of an iris, which is obtained through the image sensor module 560. Additionally, the iris recognition control module 580 may determine an exposure sensitivity of the image sensor module 560 to correspond to the infrared light emission intensity of the infrared emitting module 570.

Additionally, although not shown, the electronic device 500 may include a communication interface capable of establishing a communication with an external device (e.g., a first external electronic device, a second external electronic device, or a server). For example, the communication interface may be connected to a network through wireless communication or wired communication and communicate with the external device.

The wireless communication may use, for example, at least one of Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of communication networks such as a computer network (for example, a LAN or a WAN), the Internet, and a telephone network.

Each of the first and second external electronic devices may be of a type identical to or different from that of the electronic device 500. According to an embodiment, a server may include one or more groups of servers. According to various embodiments, all or a part of operations performed in the electronic device 500 may be performed in another or a plurality of electronic devices (e.g., an external electronic device, or a server). According to an embodiment, when the electronic device 500 should perform a function or service automatically or upon a request, the electronic device 500 may request another device (e.g., an external electronic device or a server) to perform at least some of functions associated therewith, instead of or in addition to executing the function or service itself. Another electronic device (e.g., an external electronic device or a server) may execute the requested function or additional function from the electronic device 500 and transmit a result of the execution to the electronic device 500. The electronic device 500 may provide the received result as it is or additionally process the received result and provide the requested function or service. To this end, for example, cloud computing, distributed computing, or client-server computing technology may be used.

In the case of FIG. 5, the electronic device 500 may include the iris recognition control module 580 which is separated from the processor 520.

According to an embodiment, the electronic device 500 may be configured to cause the processor 520 to perform all or at least some of the functions of the iris recognition control module 580.

Figure 6:
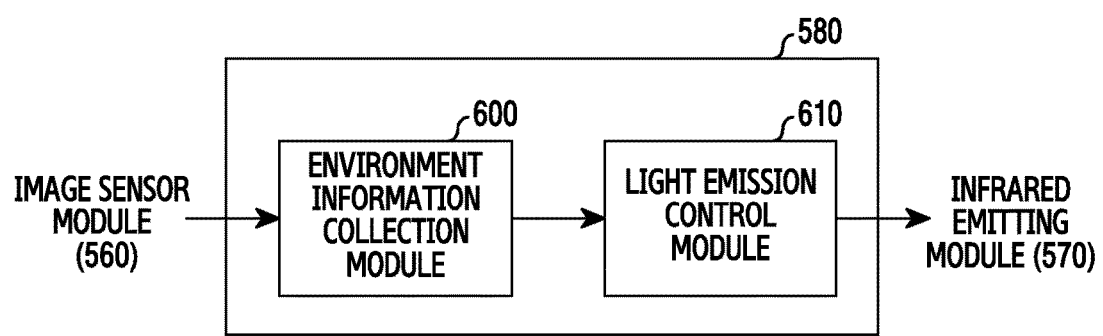
FIG. 6 illustrates a block diagram of an iris recognition control module for controlling a light emission time according to an embodiment of the present invention.

FIG. 6 illustrates a block diagram of an iris recognition control module for controlling a light emission time according to an embodiment of the present invention. In the following description, the iris recognition control module 580 may be assumed to control a light emission of the infrared emitting module 570 based on an iris recognition environment of the electronic device 500.

Referring to FIG. 6, the iris recognition control module 580 may include an environmental information collection module 600 and a light emission control module 610.

The environmental information collection module 600 may collect an environmental parameter for determining an iris control parameter from other elements (e.g., the processor 520, the memory 530, or the image sensor module 560) of the electronic device 500. According to an embodiment, the environmental information collection module 600 may collect ambient illuminance of the electronic device 500 using the image sensor module 560 or an illumination sensor functionally connected to the electronic device 500. According to an embodiment, the environmental information collection module 600 may collect at least one of a shutter speed and a sensor sensitivity of the image sensor module 560. According to an embodiment, the environmental information collection module 600 may estimate information on a distance between the electronic device 500 and a user using the image sensor module 560 or at least one sensor functionally connected to the electronic device 500.

The light emission control module 610 may determine at least one of a light emission time and a light emission intensity of the infrared emitting module 570 for iris recognition based on the environmental parameter collected by the environment information collection module 600.

According to an embodiment, the light emission control module 610 may determine an iris recognition environment in which the electronic device 500 is located (e.g., an indoor or outdoor environment), based on at least one of the ambient illuminance, the shutter speed, and the sensor sensitivity, which is provided from the environmental information collection module 600. When the electronic device 500 is located in an outdoor environment, the light emission control module 610 may set a light emission time of the infrared emitting module 570 to be relatively longer than in an indoor environment. When the electronic device 500 is located in the indoor environment, the light emission control module 610 may set the light emission time of the infrared emitting module 570 to be relatively shorter than in the outdoor environment. In addition, the light emission control module 610 may adaptively determine a light emission intensity of the infrared emitting module 570 to correspond to the iris recognition environment.

According to an embodiment, as the distance from a user estimated by the environmental information collection module 600 becomes closer, the light emission control module 610 may reduce at least one of an infrared light emission intensity and a light emission time of the infrared emitting module 570 to be proportional to the distance from the user.

According to an embodiment, the light emission control module 610 may determine an infrared light emission intensity of the infrared emitting module 570 to correspond to a position of an iris which is obtained through the image sensor module 560, provided from the environmental information collection module 600.

Figure 7:
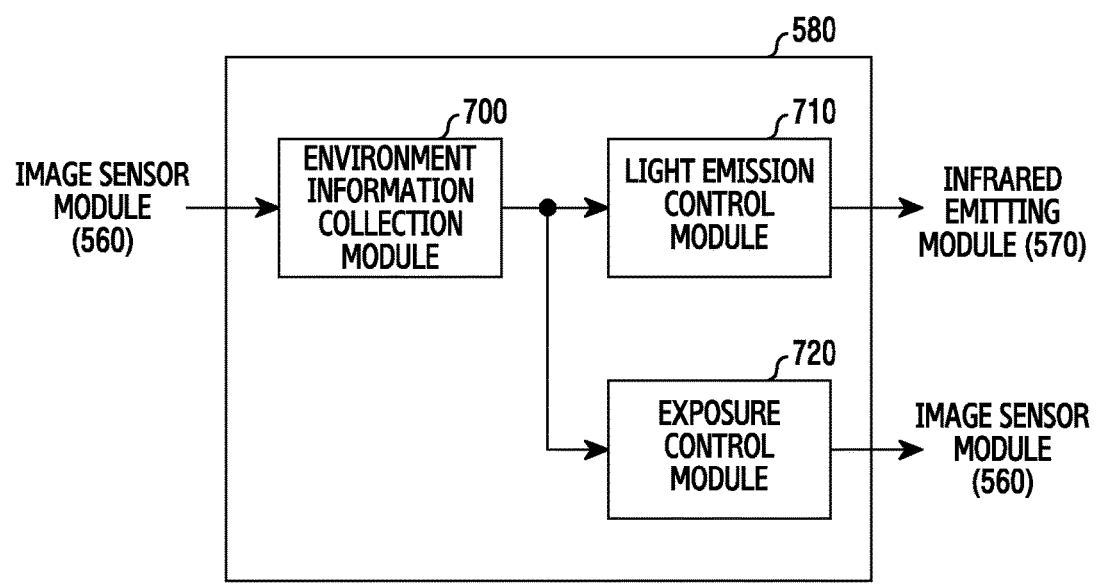
FIG. 7 illustrates a block diagram of an iris recognition control module for controlling an exposure time and a light emission time according to an embodiment of the present invention.

FIG. 7 illustrates a block diagram of an iris recognition control module for controlling an exposure time and a light emission time according to an embodiment of the present invention. In the following description, the iris recognition control module 580 may be assumed to control the light emission of the infrared emitting module 570 and exposure of the image sensor module 560 based on an iris recognition environment of the electronic device 500.

Referring to FIG. 7, the iris recognition control module 580 may include an environmental information collection module 700, a light emission control module 710, and an exposure control module 720. Here, since the environmental information collection module 700 and the light emission control module 710 operate in the same manner as the environmental information collection module 600 and the light emission control module 610 of FIG. 6, the descriptions thereof will be omitted.

The exposure control module 720 may determine an iris recognition environment for iris recognition based on an environmental parameter collected by the environmental information collection module 700, and may determine at least one of an exposure time and an exposure sensitivity of the image sensor module 560 based on an iris recognition environment.

According to an embodiment, the exposure control module 720 may determine an iris recognition environment in which the electronic device 500 is located (e.g., an indoor or outdoor environment), based on at least one of ambient illuminance, a shutter speed, and a sensor sensitivity, which is provided from the environmental information collection module 600. When the electronic device 500 is located in an outdoor environment, the exposure control module 720 may set the exposure time of the image sensor module 560 to be relatively shorter than in an indoor environment. When the electronic device 500 is located in the indoor environment, the exposure control module 720 may set the exposure time of image sensor module 560 to be relatively longer than in the outdoor environment.

According to an embodiment, the exposure control module 720 may determine the exposure sensitivity of the image sensor module 560 to correspond to the infrared light emission intensity of the infrared emitting module 570, which is determined by the light emission control module 710.

In the case of FIG. 7, the light emission control module 710 and the exposure control module 720 may use environmental parameters provided from the environmental information collection module 600, respectively, so as to determine an iris recognition environment.

According to various embodiments of the present invention, the iris recognition control module 580 may determine an iris recognition environment using one of the light emission control module 710 and the exposure control module 720, and may share the iris recognition environment information with the other module.

According to various embodiments of the present invention, the iris recognition control module 580 may determine an iris recognition environment using the environmental information collection module 700 or a separate module.

According to various embodiments of the present invention, an electronic device (for example, the electronic device 110 of FIG. 1 or the electronic device 500 of FIG. 5) may include: an image sensor module configured to obtain an image; a light emitting module configured to emit infrared light; and a processor configured to identify an iris recognition environment (e.g., environment information) using input information of the electronic device, change at least one iris recognition parameter based on the iris recognition environment, emit infrared light through the light emitting module based on the changed iris recognition parameter, and perform iris recognition using the image obtained through the image sensor module.

In an embodiment of the present invention, the processor may determine an iris recognition environment using at least one of illuminance collected through the image sensor module, a shutter speed of the image sensor module, and a sensor sensitivity of the image sensor module, wherein the iris recognition environment may include an indoor or outdoor environment.

In an embodiment of the present invention, the electronic device may further include at least one sensor configured to sense illuminance, the processor may determine an iris recognition environment using illuminance collected through the at least one sensor or the image sensor module, and the iris recognition environment may include an indoor or outdoor environment.

In an embodiment of the present invention, the processor may change at least one iris recognition parameter of an exposure time of the image sensor module, a light emission time of the light emitting module, a light emission intensity of the light emitting module, and an emission scheme of the light emitting module, based on the iris recognition environment, wherein the infrared light emission scheme may include at least one of a continuous wave scheme and a pulse scheme.

In an embodiment of the present invention, in a case of an outdoor environment, the processor may set the exposure time of the image sensor module to be relatively shorter than in an indoor environment, and may set the light emission time of the light emitting module to be relatively longer than in the indoor environment, and in a case of the indoor environment, the processor may set the exposure time of the image sensor module to be relatively longer than in the outdoor environment, and may set the light emission time of the light emitting module to be relatively shorter than in the outdoor environment.

In an embodiment of the present invention, the electronic device may further include at least one sensor configured to estimate a distance between the electronic device and a user, and the processor may adjust a light emission amount of the light emitting module based on the distance between the electronic device and the user, which is estimated using the at least one sensor or the image sensor module, wherein the light emission amount of the light emitting module may include at least one of a light emission time and a light emission intensity of the light emitting module.

In the embodiment of the present invention, when the processor adjusts the light emission intensity of the light emitting module based on the distance between the electronic device and the user, the processor may adjust the sensitivity of the image sensor module to correspond to the light emission intensity of the light emitting module.

In an embodiment of the present invention, the at least one sensor configured to estimate the distance between the electronic device and the user may include at least one of a proximity sensor, an illumination sensor, a distance measurement sensor of a Time Of Flight (TOF) scheme, and a depth sensor.

In an embodiment of the present invention, the processor may identify a position of an iris image in the image obtained through the image sensor module, and may adjust the light emission intensity of the light emitting module to correspond to the position of the iris image.

Figure 8:
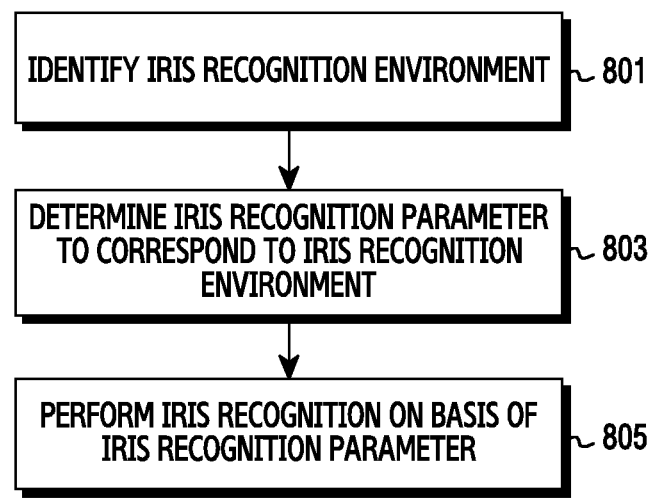
FIG. 8 illustrates a flow chart for controlling an iris recognition parameter corresponding to ambient illuminance in an electronic device according to an embodiment of the present invention.

FIG. 8 illustrates a flow chart for controlling an iris recognition parameter corresponding to ambient illuminance in an electronic device according to the embodiment of the present invention.

Referring to FIG. 8, in operation 801, an electronic device (e.g., the electronic device 110 of FIG. 1 or the electronic device 500 of FIG. 5) may identify an iris recognition environment. For example, the electronic device may use ambient illuminance of the electronic device to determine an indoor or outdoor environment in which the electronic device is located. For example, the electronic device may determine an indoor or outdoor environment in which the electronic device is located, by using at least one of a shutter speed and a sensor sensitivity of the image sensor module functionally connected to the electronic device.

In operation 803, the electronic device may determine an iris recognition parameter to correspond to the iris recognition environment. For example, the electronic device may determine at least one of an exposure time of the image sensor module 560 and a light emission time of the infrared emitting module 570, as described in FIG. 3A or FIG. 4A, to correspond to the indoor or outdoor environment in which the electronic device is located. In addition, the electronic device may adaptively control a light emission intensity of the infrared emitting module 570 to correspond to the iris recognition environment.

In operation 805, the electronic device may perform iris recognition based on an iris recognition parameter determined to correspond to the iris recognition environment. For example, the electronic device may authenticate a user by comparing iris information collected through the image sensor module 560 with pre-stored iris information of the user during the light emission time.

Figure 9:
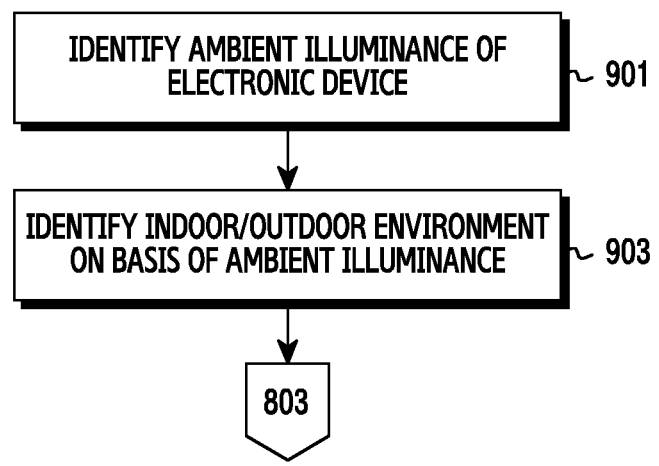
FIG. 9 illustrates a flow chart for controlling an iris recognition parameter to correspond to an outdoor/indoor environment in an electronic device according to an embodiment of the present invention.

FIG. 9 illustrates a flow chart for controlling an iris recognition parameter to correspond to an outdoor/indoor environment in an electronic device according to an embodiment of the present invention.

FIG. 9, in operation 901, the electronic device may identify ambient illuminance of the electronic device. For example, the electronic device may measure ambient illuminance using the image sensor module 560 or an illumination sensor, which is functionally connected thereto.

In operation 903, the electronic device may identify an indoor or outdoor environment in which the electronic device is located, based on the ambient illuminance. For example, when the illuminance above a threshold value is continuously identified during a reference time, the electronic device may determine that the electronic device is located in an outdoor environment.

In operation 803 of FIG. 8, the electronic device may determine an iris recognition parameter to correspond to the indoor or outdoor environment in which the electronic device is located.

Figure 10:
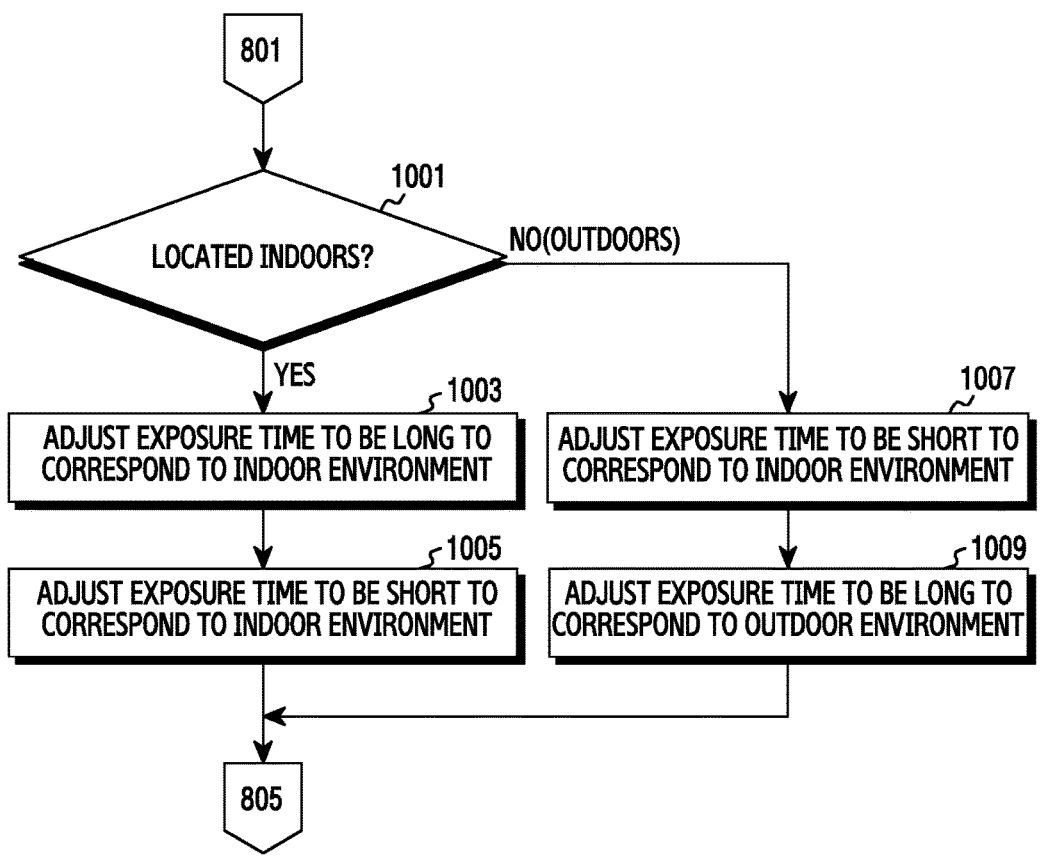
FIG. 10 illustrates a flow chart for controlling a light emission time to correspond to ambient illuminance in an electronic device according to an embodiment of the present invention.

FIG. 10 illustrates a flow chart for controlling light emission time to correspond to ambient illuminance in an electronic device according to an embodiment of the present invention.

Referring to FIG. 10, in operation 1001, the electronic device may identify whether the electronic device is located indoors, based on the iris recognition environment determined in operation 801 of FIG. 8.

In operation 1003, when the electronic device is located indoors, an exposure time of the image sensor module 560 may be adjusted to be relatively longer than in an outdoor environment.

In operation 1005, the electronic device may adjust a light emission time of the infrared emitting module 570 to be relatively shorter than in the outdoor environment.

In operation 805 of FIG. 8, the electronic device may perform iris recognition based on the exposure time and the light emission time, which are adjusted in operation 1003 and operation 1005.

In operation 1007, when the electronic device is located outdoors, the electronic device may adjust the exposure time of the image sensor module 560 to be relatively shorter than in an indoor environment.

In operation 1009, the electronic device may adjust the light emission time of the infrared emitting module 570 to be relatively longer than in the indoor environment.

In operation 805 of FIG. 8, the electronic device may perform iris recognition based on the exposure time and the light emission time, which are adjusted in operation 1007 and operation 1009.

In the case of FIG. 10, the electronic device may adjust the light emission time of the infrared emitting module 570 after adjusting the exposure time of the image sensor module 560.

According to various embodiments of the present invention, the electronic device may adjust an exposure time of the image sensor module 560 and a light emission time of the infrared light emitting module 570 in parallel at the same time point.

According to various embodiments of the present invention, the electronic device may adjust an exposure time of the image sensor module 560 after adjusting a light emission time of the infrared emitting module 570.

Figure 11:
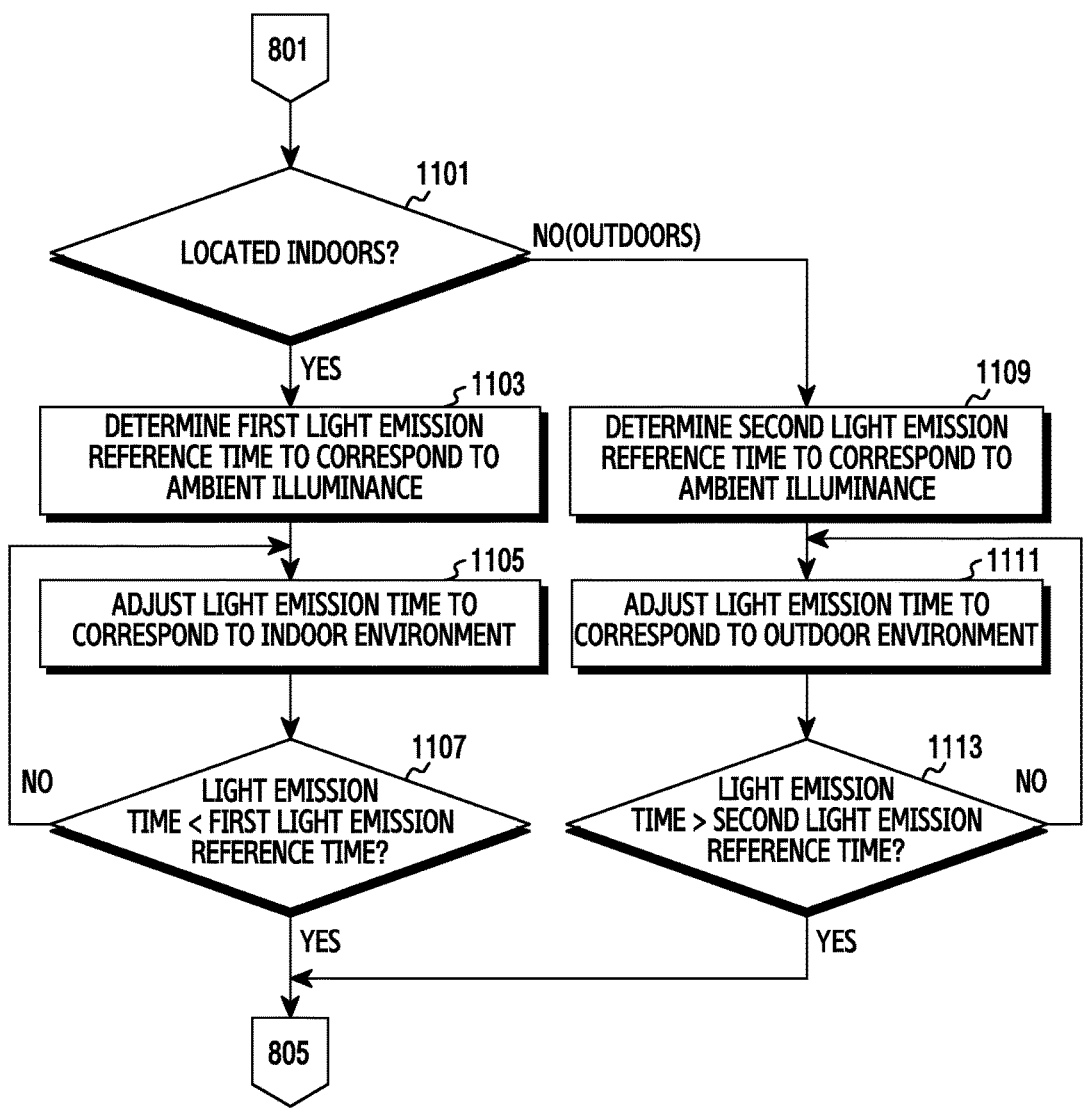
FIG. 11 illustrates a flow chart for controlling a light emission time to correspond to ambient illuminance in an electronic device according to an embodiment of the present invention.

FIG. 11 illustrates a flow chart for controlling a light emission time to correspond to ambient illuminance in an electronic device according to an embodiment of the present invention.

Referring to FIG. 11, in operation 1101, the electronic device may identify whether the electronic device is located indoors, based on the iris recognition environment determined in operation 801 of FIG. 8.

In operation 1103, when the electronic device is located indoors, the electronic device may determine a first light emission reference time to correspond to ambient illuminance. For example, the electronic device may determine the maximum light emission time to correspond to the ambient illuminance.

In operation 1105, the electronic device may update an infrared light emission time to correspond to an indoor environment in units of reference time. For example, the electronic device may reduce a predetermined infrared light emission time by a reference time. Here, the predetermined infrared light emission time may include a previously updated infrared light emission time.

In operation 1107, the electronic device may identify whether the infrared light emission time updated in operation 1105 is smaller than the first light emission reference time.

In operation 805 of FIG. 8, when the infrared light emission time updated in operation 1105 is smaller than the first light emission reference time, the electronic device may perform iris recognition based on the updated infrared light emission time.

In operation 1105, when the infrared light emission time updated in the previous operation 1105 is equal to or greater than the first light emission reference time, the electronic device may re-update the infrared light emission time in the units of reference time.

In operation 1109, when the electronic device is located outdoors, the electronic device may determine a second light emission reference time to correspond to the ambient illuminance. For example, the electronic device may determine the minimum light emission time to correspond to the ambient illuminance.

In operation 1111, the electronic device may update the infrared light emission time to correspond to an outdoor environment in the units of reference time. For example, the electronic device may increase a predetermined infrared light emission time by the reference time. Here, the predetermined infrared light emission time may include a previously updated infrared light emission time.

In operation 1113, the electronic device may identify that the infrared light emission time updated in operation 1111 exceeds the second light emission reference time.

In operation 805 of FIG. 8, when the infrared light emission time updated in operation 1111 exceeds the second light emission reference time, the electronic device may perform iris recognition based on the updated infrared light emission time.

In operation 1111, when the infrared light emission time updated in the previous operation 1111 is equal to or less than the second light emission reference time, the electronic device may re-update the infrared light emission time in the units of reference time.

According to an embodiment, in the electronic device, a reference time for increasing the infrared light emission time and a reference time for decreasing the infrared light emission time may be the same or different.

Figure 12:
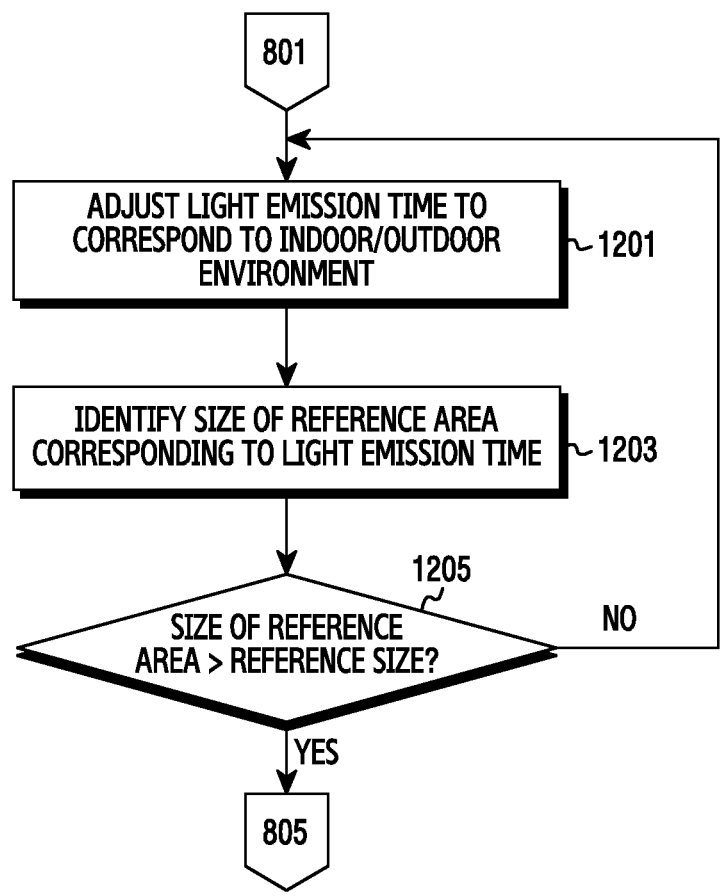
FIG. 12 illustrates a flow chart for controlling a light emission time based on the size of a reference area in an electronic device according to an embodiment of the present invention.

FIG. 12 illustrates a flow chart for controlling a light emission time based on the size of a reference area in an electronic device according to an embodiment of the present invention.

Referring to FIG. 12, in operation 1201, the electronic device may adjust an infrared light emission time for iris recognition to correspond to the iris recognition environment (for example, an indoor or outdoor environment) determined in operation 801 of FIG. 8. For example, when the electronic device is located in an indoor environment, the electronic device may reduce a predetermined infrared light emission time by a reference time. For example, when the electronic device is located in an outdoor environment, the electronic device may increase the predetermined infrared light emission time by the reference time so that infrared light component is not saturated by an external light. Here, the predetermined infrared light emission time may include a previously updated infrared light emission time.

In operation 1203, the electronic device may identify the size of a reference area corresponding to the infrared light emission time adjusted in operation 1201. For example, as shown in FIGS. 3C and 4C, the electronic device may identify the sizes of reference areas 312 and 412, which correspond to the predetermined exposure time of the image sensor module 560 and the light emission time of the infrared emitting module 570 adjusted in operation 1201.

In operation 1205, the electronic device may identify whether the size of the reference area exceeds a reference size. Here, the reference size may indicate the minimum size required for iris recognition corresponding to an iris recognition environment by the electronic device.

In operation 1201, when the size of the reference area is smaller than the reference size, the electronic device may adjust the infrared light emission time for iris recognition.

In operation 805 of FIG. 8, when the size of the reference area is equal to or greater than the reference size, the electronic device may perform iris recognition based on the infrared light emission time adjusted in operation 1201.

Figure 13:
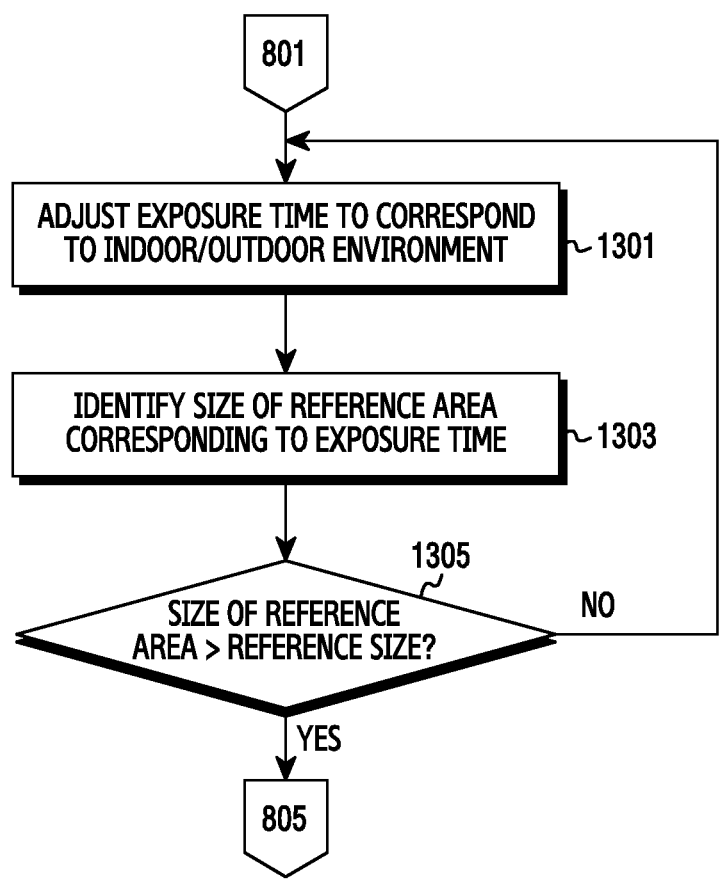
FIG. 13 illustrates a flow chart for controlling an exposure time based on the size of a reference area in an electronic device according to an embodiment of the present invention.

FIG. 13 illustrates a flow chart for controlling an exposure time based on the size of a reference area in an electronic device according to an embodiment of the present invention.

Referring to FIG. 13, in operation 1301, the electronic device may adjust an exposure time of the image sensor module 560 to correspond to the iris recognition environment (e.g., an indoor or outdoor environment) determined in the operation 801 of FIG. 8. For example, when the electronic device is located in an indoor environment, the electronic device may increase a predetermined exposure time by a reference time. For example, when the electronic device is located in an outdoor environment, the electronic device may reduce the predetermined exposure time by the reference time so that an infrared component is not saturated by an external light.

In operation 1303, the electronic device may identify the size of a reference area corresponding to the exposure time adjusted in operation 1301. For example, as shown in FIGS. 3C and 4C, the electronic device may identify the sizes of reference areas 312 and 412, which correspond to the exposure time of the image sensor module 560 adjusted in operation 1301 and the predetermined light emission time of the infrared emitting module 570.

In operation 1305, the electronic device may identify whether the size of the reference area exceeds a reference size. Here, the reference size may indicate the minimum size required for iris recognition corresponding to an iris recognition environment by the electronic device.

In operation 1301, when the size of the reference area is smaller than the reference size, the electronic device may adjust the exposure time for iris recognition again.

In operation 805 of FIG. 8, when the size of the reference area is equal to or larger than the reference size, the electronic device may perform iris recognition based on the exposure time adjusted in operation 1301.

According to an embodiment, the electronic device may adjust a light emission intensity of infrared light to correspond to an iris recognition environment. For example, the electronic device may set the light emission intensity of infrared light in an outdoor environment to be relatively stronger than in an indoor environment. In this case, the electronic device may adjust an infrared light emission time to correspond to the light emission intensity of infrared light as shown in FIGS. 14A to 14B such that the luminescence energy of infrared light is kept constant for the safety of a user's eye.

Figure 14A:
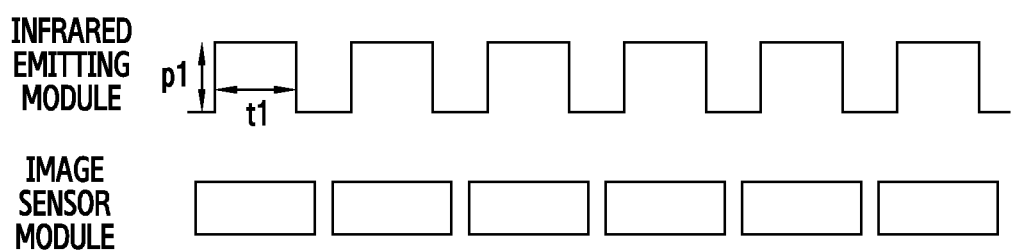
FIGS. 14A to 14B illustrate an emission form of infrared light based on the safety of a user's eye according to an embodiment of the present invention.
Figure 14B:
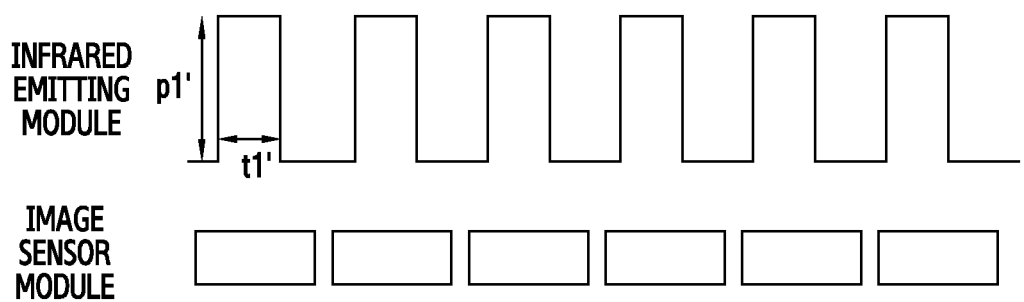

FIGS. 14A to 14B illustrate an emission form of infrared light based on the safety of a user's eye according to an embodiment of the present invention.

Referring to FIG. 14A, an electronic device (e.g., the electronic device 110 of FIG. 1 or the electronic device 500 of FIG. 5) may adjust a light emission time (t1) of infrared light to correspond to a light emission intensity (p1) of infrared light, which is set to correspond to an iris recognition environment.

Referring to FIG. 14B, when the electronic device increases the light emission intensity of infrared light in response to a change in the iris recognition environment (p1->p1'), the electronic device may reduce the infrared light emission time to correspond to the increase of the infrared light emission intensity (t1->t1') in order to keep the amount of the infrared light emission constant.

In the case of FIGS. 14A to 14B, the electronic device may determine an infrared light emission intensity (p1 or p1') so as not to affect the safety of a user's eye.

Figure 15A:
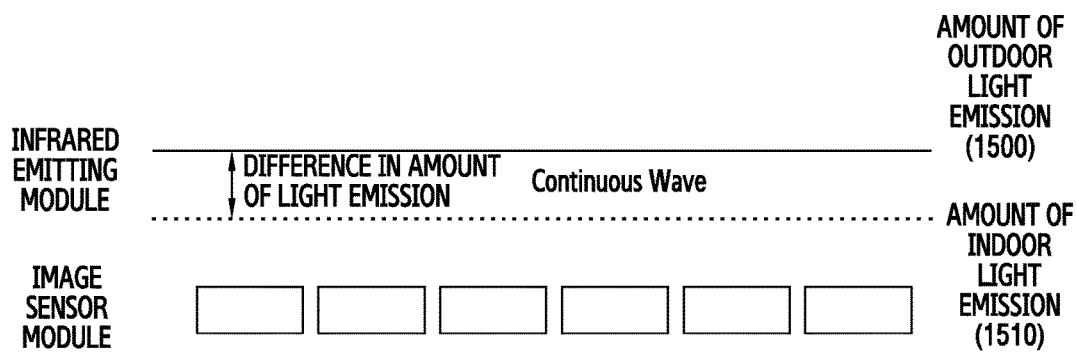
FIGS. 15A to 15B illustrate an emission form of infrared light for iris recognition according to an embodiment of the present invention.
Figure 15B:
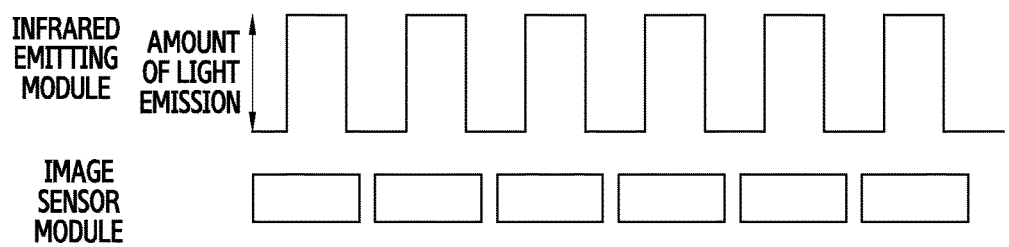

FIGS. 15A to 15B illustrate an emission form of infrared light for iris recognition according to an embodiment of the present invention.

Referring to FIG. 15A, an electronic device (e.g., the electronic device 110 of FIG. 1 or the electronic device 500 of FIG. 5) may lower an infrared light emission intensity 1510 in an indoor environment, which is relatively less affected by infrared light by an external light, than an infrared light emission intensity 1500 in an outdoor environment so as to continuously emit light (for example, a continuous wave light emission scheme). In this case, the electronic device may determine the infrared light emission intensity 1500 or 1510 so as not to affect the safety of a user's eye.

According to an embodiment, the electronic device may emit infrared light to correspond to an infrared light emission time in an indoor environment as shown in FIG. 15B (e.g., a pulse light emission scheme). In this case, the electronic device may determine the infrared light emission intensity so as not to affect the safety of a user's eye.

Figure 16A:
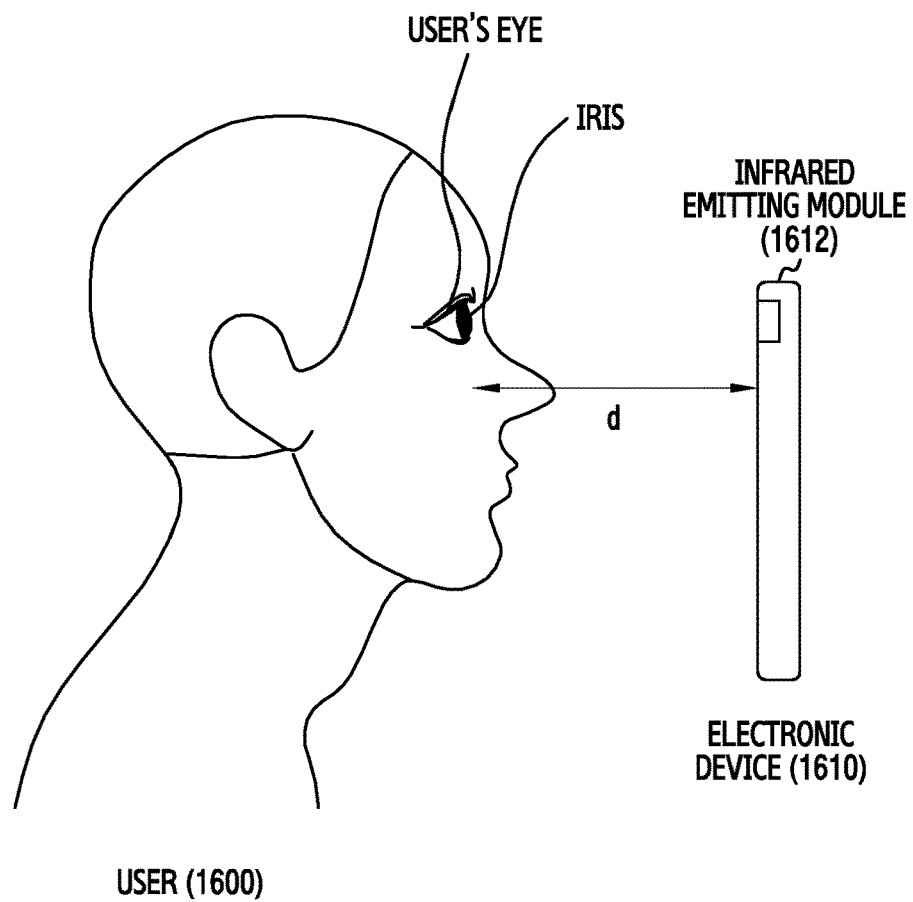
FIGS. 16A to 16B illustrate a configuration for controlling a light emission intensity to correspond to a distance between a user and an electronic device according to an embodiment of the present invention.
Figure 16B:
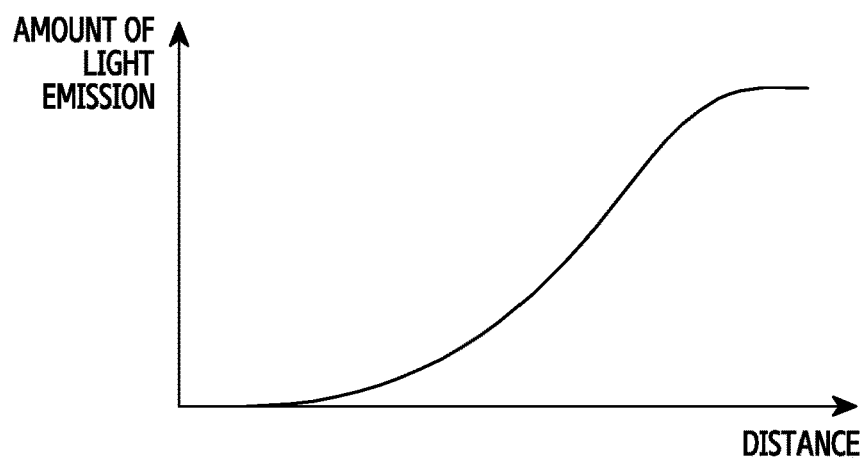

FIGS. 16A to 16*b* illustrate a configuration for controlling a light emission intensity to correspond to a distance between a user and an electronic device according to an embodiment of the present invention.

Referring to FIG. 16A, an electronic device 1610 (e.g., the electronic device 110 of FIG. 1 or the electronic device 500 of FIG. 5) may emit infrared light in a state where the electronic device 1610 is spaced from a user 1600 by a predetermined distance (d), thereby recognizing a user's iris.

When the electronic device 1610 emits infrared light having a predetermined size (e.g., a light emission amount), regardless of the distance from the user 1600, the closer a distance from the electronic device 1610, the more an eye of the user 1600 may be damaged by the infrared light emitted from the electronic device 1610. Accordingly, the electronic device 1610 may adjust the amount of infrared light emission to correspond to a distance from the user 1600 as shown in FIG. 16B.

Figure 17A:
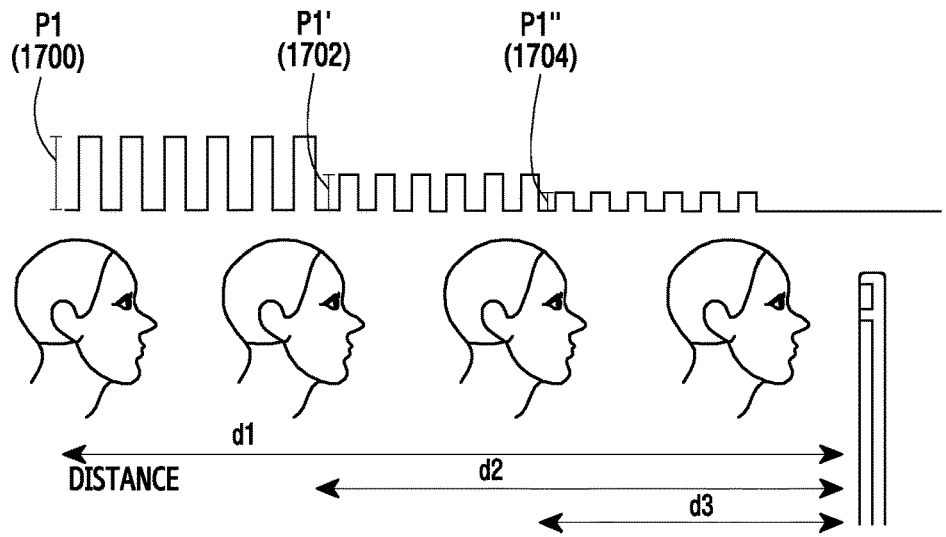
FIGS. 17A to 17C illustrate a configuration for controlling a light emission intensity according to an embodiment of the present invention.
Figure 17B:
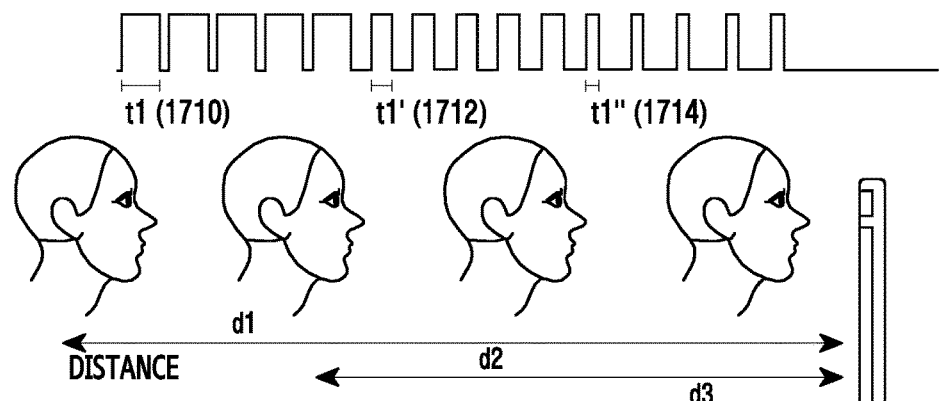
Figure 17C:
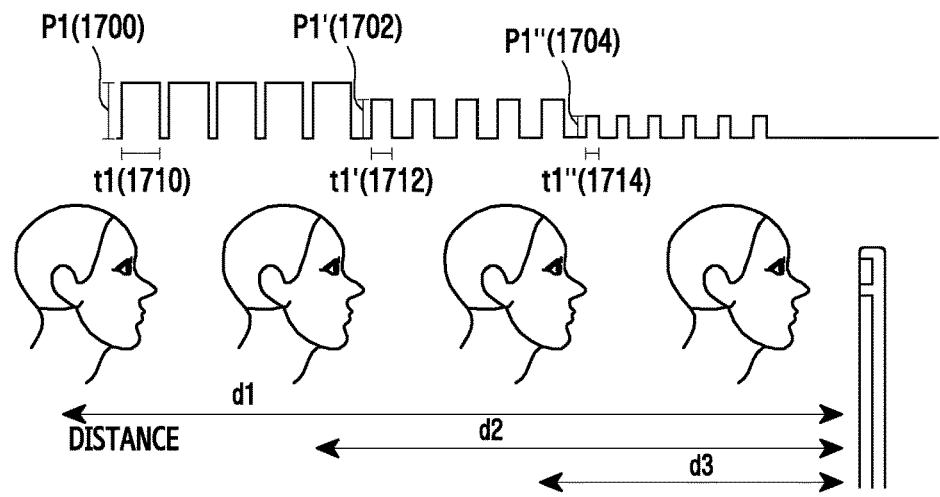

FIGS. 17A to 17C illustrate a configuration for controlling a light emission intensity according to an embodiment of the present invention.

Referring to FIG. 17A, an electronic device (e.g., the electronic device 110 of FIG. 1 or the electronic device 500 of FIG. 5) may adjust a light emission intensity of infrared light to correspond to a distance from a user. For example, when the electronic device is spaced from the user by a distance d1, the electronic device may emit infrared light at an intensity of p1 1700. When a distance from the user is reduced from d1 to d2, the electronic device may reduce the light emission intensity of infrared light from p1 1700 to p1' 1702 so as to correspond to the reduction in the distance from the user. When the distance from the user is reduced from d2 to d3, the electronic device may reduce the light emission intensity of infrared light from p1' 1702 to p1" 1704 so as to correspond to the reduction in the distance from the user.

Referring to FIG. 17B, the electronic device may adjust a light emission time of infrared light to correspond to the distance from the user. For example, when the electronic device is spaced from the user by the distance d1, the electronic device may emit infrared light for a time t1 1710. When the distance from the user is reduced from d1 to d2, the electronic device may reduce the light emission time of infrared light from t1 1710 to t1' 1712 so as to correspond to the reduction in the distance from the user. When the distance from the user is reduced from d2 to d3, the electronic device may reduce the light emission time of infrared light from t1' 1712 to t1" 1714 so as to correspond to the reduction in the distance from the user.

Referring to FIG. 17C, the electronic device may adjust the light emission intensity and the light emission time of infrared light to correspond to the distance from the user. For example, when the electronic device is spaced from the user by the distance d1, the electronic device may emit infrared light at the intensity of p1 1700 for the time t1 1710. When a distance from the user is reduced from d1 to d2, the electronic device may reduce the light emission intensity of infrared light from p1 1700 to p1' 1702 and reduce the emission time of infrared light from t1 1710 to t1' 1712 so as to correspond to the reduction in the distance from the user. When the distance from the user is reduced from d2 to d3, the electronic device may reduce the light emission intensity of infrared light from p1' 1702 to p1" 1704 and reduce the emission time of infrared light from t1' 1712 to t1" 1714 so as to correspond to the reduction in the distance from the user.

Figure 18:
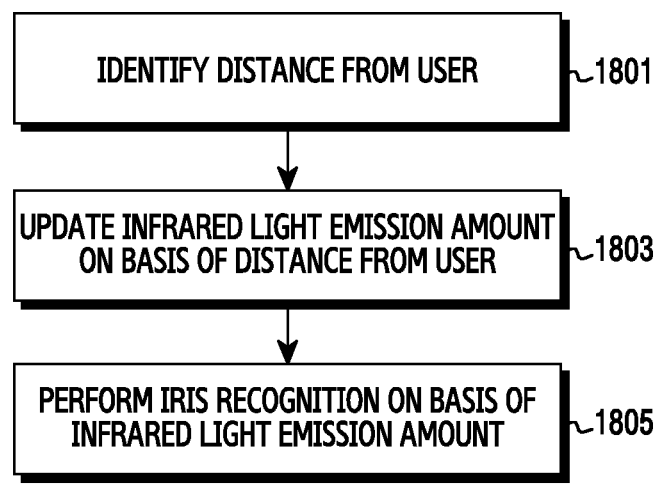
FIG. 18 illustrates a flow chart for controlling a light emission intensity of infrared light based on a distance between a user and an electronic device in the electronic device according to an embodiment of the present invention.

FIG. 18 illustrates a flow chart for controlling a light emission intensity of infrared light based on a distance between a user and an electronic device in the electronic device according to an embodiment of the present invention.

Referring to FIG. 18, in operation 1801, an electronic device (e.g., the electronic device 110 of FIG. 1 or the electronic device 500 of FIG. 5) may estimate a distance from a user. For example, the electronic device may estimate the distance from the user by using an image sensor module 560, a proximity sensor, an illumination sensor, a distance measurement sensor of a time of flight (TOF) scheme, and a depth sensor.

In operation 1803, the electronic device may adjust an emission amount of infrared light to correspond to the distance from the user. For example, the electronic device may adjust at least one of an infrared light emission intensity and an emission time to correspond to the distance from the user.

In operation 1805, the electronic device may perform iris recognition by emitting infrared light to correspond to the emission amount of infrared light, which is adjusted in operation 1803.

According to an embodiment, the electronic device may adjust an infrared light emission amount to correspond to a distance from a user as shown in FIG. 18, after determining an iris recognition parameter to correspond to an iris recognition environment as shown in FIG. 8.

Figures 19A, 19B, 19C:
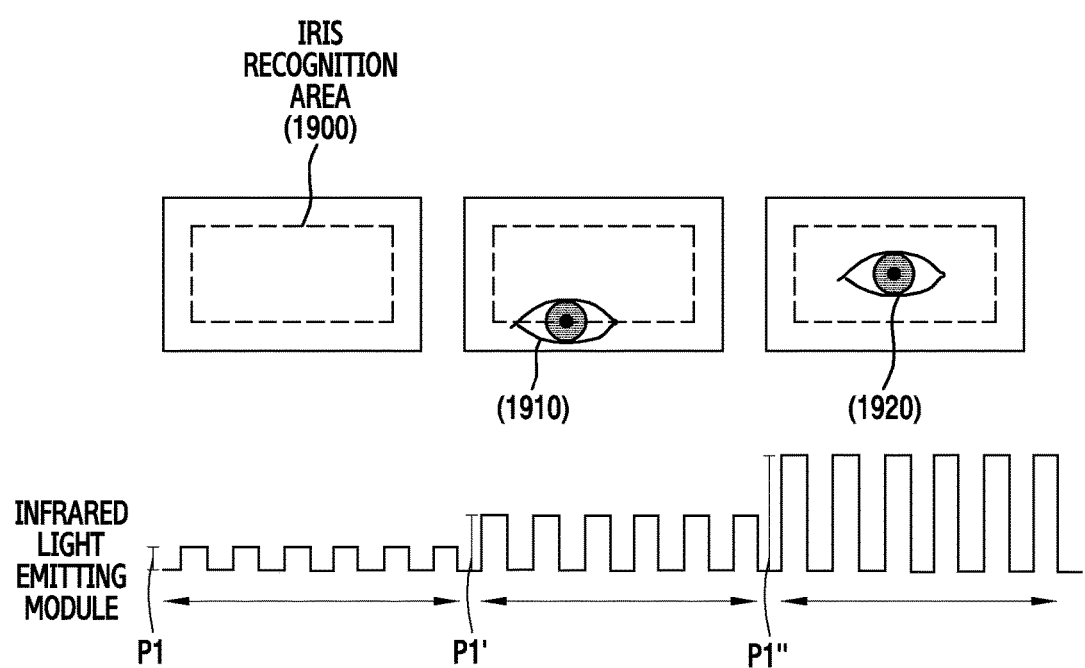
FIGS. 19A to 19C illustrate a configuration for controlling a light emission intensity to correspond to a position of an iris according to an embodiment of the present invention.

FIGS. 19A to 19C illustrate a configuration for controlling a light emission intensity to correspond to a position of an iris according to an embodiment of the present invention.

An electronic device (e.g., the electronic device 110 of FIG. 1 or the electronic device 500 of FIG. 5) may adjust an infrared light emission intensity based on a position of a user' iris and an iris recognition area 1900 of an image obtained through the image sensor module 560. Accordingly, the electronic device may reduce the power consumption due to iris recognition.

When a user's iris is not located on the image obtained through the image sensor module 560 as shown in FIG. 19A, the electronic device may emit infrared light at the minimum intensity using the infrared emitting module 570.

When a user's iris is not located within the iris recognition area 1900 on the image obtained through the image sensor module 560 as shown in FIG. 19B 1910, the electronic device may adjust the infrared light emission intensity to correspond to a position of the user's iris, which is included in the image.

When a user's iris is located within the iris recognition area 1900 in the image obtained through the image sensor module 560 as shown in FIG. 19C 1920, the electronic device may emit infrared light at the intensity stronger than the infrared light emission intensity of FIG. 19B. In this case, the electronic device may determine the infrared light emission intensity so as not to affect the safety of a user's eye.

Figure 20:
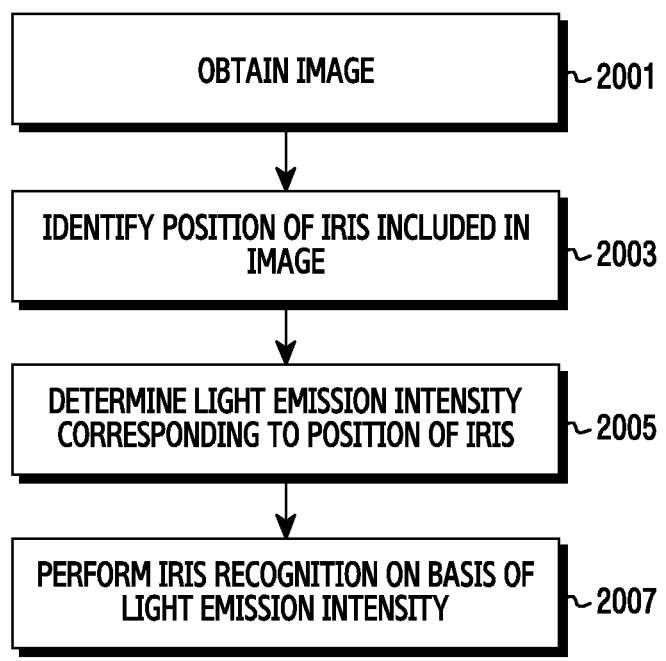
FIG. 20 illustrates a flow chart for controlling a light emission intensity of infrared light in an electronic device according to an embodiment of the present invention.

FIG. 20 illustrates a flow chart for controlling a light emission intensity of infrared light in an electronic device according to an embodiment of the present invention.

Referring to FIG. 20, in operation 2001, an electronic device (e.g., the electronic device 110 of FIG. 1 or the electronic device 500 of FIG. 5) may obtain an image through an image sensor module 560.

In operation 2003, the electronic device may identify a position of an iris, which is included in the image.

In operation 2005, the electronic device may determine an infrared light emission intensity to correspond to the position of the iris, which is included in the image. For example, the electronic device may determine the infrared light emission intensity based on whether the user's iris is located within an iris recognition area of the image as shown in FIGS. 19A to 19C.

In operation 2007, the electronic device may perform iris recognition by emitting infrared light with the emission intensity determined in operation 2005.

Figures 21A, 21B, 21C:
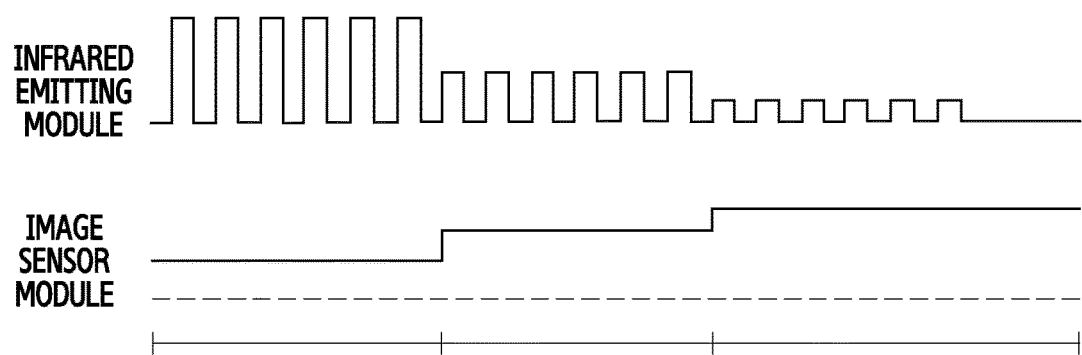
FIGS. 21A to 21C illustrate a configuration for controlling the sensitivity of an image sensor module to correspond to an infrared light emission intensity according to an embodiment of the present invention.

FIGS. 21A to 21C illustrate a configuration for controlling the sensitivity of an image sensor module to correspond to an infrared light emission intensity according to an embodiment of the present invention.

The larger the emission intensity of the infrared emitting module 570 for the iris recognition, the larger the intensity of infrared light reflected by a subject (e.g., a user's iris), and because of this, the more the emission intensity of the infrared emitting module 570 increases, the more easily the image sensor module 560 of the electronic device may detect the infrared light reflected by the subject. Accordingly, the electronic device may adjust an exposure sensitivity of the image sensor module 560 to correspond to the light emission intensity of the infrared emitting module 570.

According to an embodiment, when the light emission intensity of the infrared emitting module 570 is large as shown in FIG. 21A, the electronic device may set the sensitivity of the image sensor module 560 to be low so as to correspond to the light emission intensity of the infrared emitting module 570.

According to an embodiment, when the light emission intensity of the infrared emitting module 570 decreases as shown in FIG. 21B, the electronic device may set the sensitivity of the image sensor module 560 to be high so as to correspond to the decrease in the light emission intensity of the infrared emitting module 570.

According to an embodiment, when the emission intensity of the infrared emitting module 570 decreases as shown in FIG. 21C, the electronic device may set the sensitivity of the image sensor module 560 to be further high so as to correspond to the decrease in the light emission intensity of the infrared emitting module 570.

Figure 22:
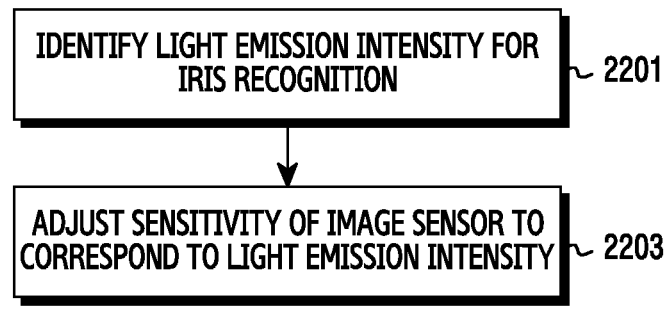
FIG. 22 illustrates a configuration for controlling the sensitivity of an image sensor module to correspond to an infrared light emission intensity according to an embodiment of the present invention.

FIG. 22 illustrates a configuration for controlling the sensitivity of an image sensor module to correspond to infrared light emission intensity according to an embodiment of the present invention.

Referring to FIG. 22, in operation 2201, an electronic device (e.g., the electronic device 110 of FIG. 1 or the electronic device 500 of FIG. 5) may identify a light emission intensity of an infrared emitting module 570 for iris recognition.

In operation 2203, the electronic device may adjust the sensitivity of the image sensor module 560 to correspond to the light emission intensity of the infrared emitting module 570. For example, the electronic device may adjust the sensitivity of the image sensor module 560 to be in inverse proportion to the light emission intensity of the infrared light emitting module 570.

According to various embodiments, a method of an electronic device may include: identifying an iris recognition environment using at least one input information of the electronic device; changing at least one iris recognition parameter based on the iris recognition environment; emitting infrared light based on the changed iris recognition parameter; and performing iris recognition using an image obtained through an image sensor module.

In the embodiment of the present invention, the identifying the iris recognition environment may include: identifying illuminance through at least one sensor configured to sense illuminance or the image sensor module; and determining an indoor or outdoor environment in which the electronic device is located, using the identified illuminance.

In an embodiment of the present invention, the changing the iris recognition parameter may include: changing at least one iris recognition parameter of an exposure time of the image sensor module, an infrared light emission time, an infrared light emission intensity, and an infrared light emission scheme, based on the iris recognition environment, wherein the infrared light emitting scheme may include at least one of a continuous wave scheme and a pulse scheme.

In an embodiment of the present invention, the changing the iris recognition parameter may include: in a case of an outdoor environment, setting the exposure time of the image sensor module to be relatively shorter than in an indoor environment and setting the light emission time of the light emitting module to be relatively longer than in the indoor environment; and, in a case of the indoor environment, setting the exposure time of the image sensor module to be relatively longer than in the outdoor environment and setting the light emission time of the light emitting module to be relatively shorter than in the outdoor environment.

An embodiment of the present invention may further include: estimating a distance between the electronic device and a user; and adjusting an emission amount of infrared light based on the distance between the electronic device and the user, wherein the amount of infrared light emission may include at least one of an infrared light emission time and an infrared light emission intensity.

An embodiment of the present invention may further include identifying a position of an iris image in the image obtained through the image sensor module, and adjusting an infrared light emission intensity to correspond to the position of the iris image.

Figure 23:
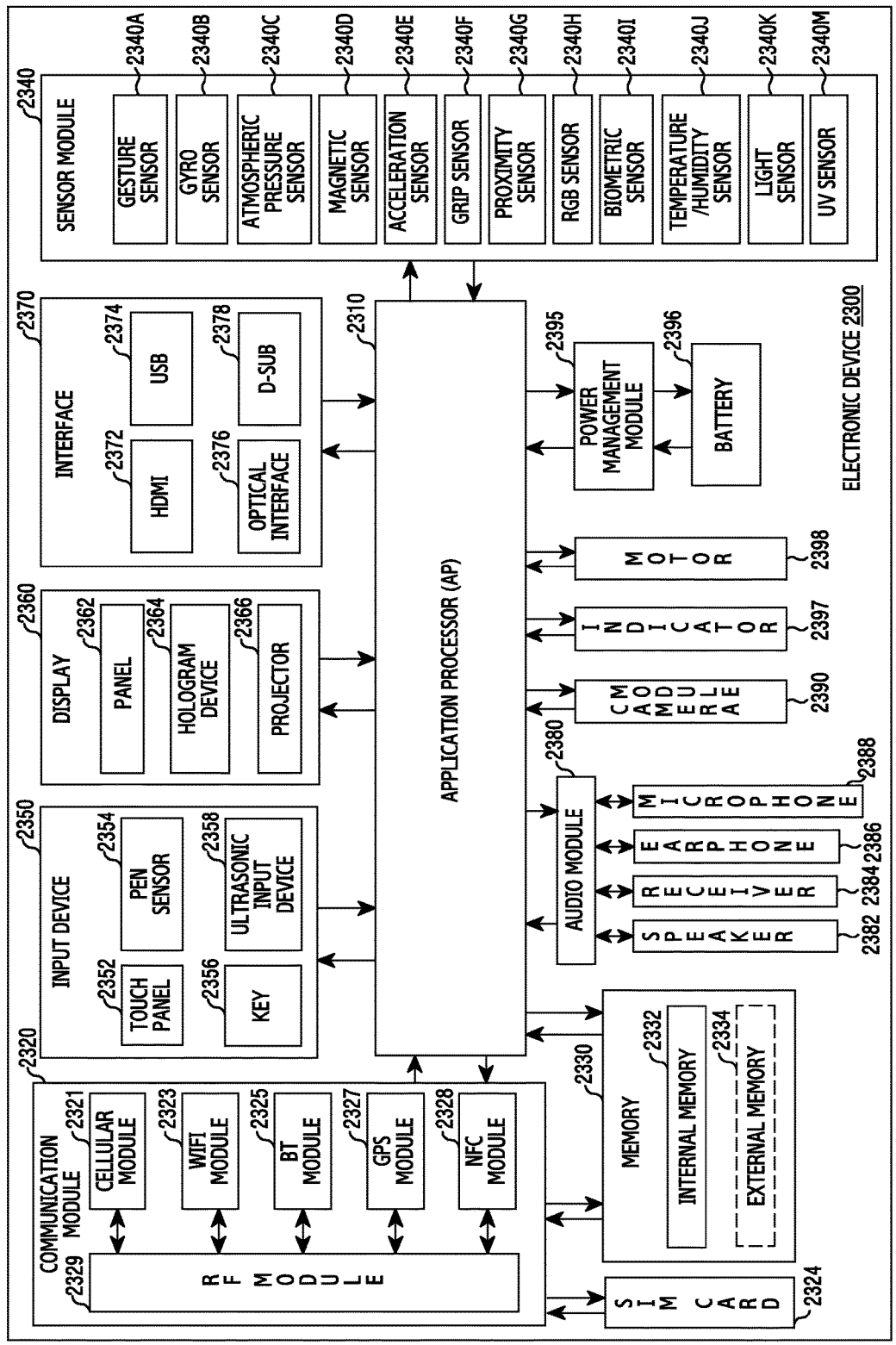
FIG. 23 illustrates a block diagram of an electronic device according to an embodiment of the present invention.

FIG. 23 is a block diagram of an electronic device according to an embodiment of the present invention. Hereinafter, an electronic device 2300 may constitute, for example, all or a part of the electronic device 500 illustrated in FIG. 5.

Referring to FIG. 23, the electronic device 2300 may include at least one Application Processor (AP) 2310, a communication module 2320, a Subscriber Identification Module (SIM) card 2324, a memory 2330, a sensor module 2340, an input electronic device 2350, a display 2360, an interface 2370, an audio module 2380, an image sensor module 2391, a power management module 2395, a battery 2396, an indicator 2397, and a motor 2398.

The AP 2310 may control a plurality of hardware or software components connected to the AP 2310 by driving an operation system or an application program, and may perform processing or an operation of various data including multimedia data. The AP 2310 may be implemented as, for example, a System on Chip (SoC). According to an embodiment, the AP 2310 may further include a graphic processing unit (GPU) (not illustrated).

The communication module 2320 may perform data transmission/reception in communication between different electronic devices connected to the electronic device 2300 (for example, the electronic device 500) through a network. According to an embodiment, the communication module 2320 may include a cellular module 2321, a Wi-Fi module 2323, a BT module 2325, a GPS module 2327, an NFC module 2328, and a Radio Frequency (RF) module 2329.

The cellular module 2321 may provide a voice call, a video call, a text message service, or an Internet service through a communication network (for example, LTE, LTE-A, CDMA, WCDMA, UMTS, WiBro, or GSM). Further, the cellular module 2321 may distinguish between and authenticate electronic devices in a communication network using, for example, a subscriber identification module (for example, the SIM card 2324). According to an embodiment, the cellular module 2321 may perform at least some of the functions that the AP 2310 may provide. For example, the cellular module 2321 may perform at least some of the multimedia control functions.

According to an embodiment, the cellular module 2321 may include a Communication Processor (CP). Further, the cellular module 2321 may be implemented by, for example, an SoC. Although the components, such as the cellular module 2321 (for example, the communication processor), the memory 2330, or the power management module 2395 are illustrated as elements separated from the AP 2310, but, according to an exemplary embodiment, the AP 2310 may include at least some of the above described elements (for example, the cellular module 2321).

According to an embodiment, the AP 2310 or the cellular module 2321 (e.g., the communication processor) may load a command or data received from at least one of a non-volatile memory and other components connected thereto to a volatile memory, and may process the loaded command or data. Further, the AP 2310 or the cellular module 2321 may store data received from or generated by at least one of other components in a non-volatile memory.

For example, the Wi-Fi module 2323, the BT module 2325, the GPS module 2327, and the NFC module 2328 may include a processor for processing data transmitted/received through the corresponding module. Although the cellular module 2321, the Wi-Fi module 2323, the BT module 2325, the GPS module 2327, and the NFC module 2328 are shown as separate blocks in FIG. 23, at least some (e.g., two or more) of the cellular module 2321, the Wi-Fi module 2323, the BT module 2325, the GPS module 2327, and the NFC module 2328 may be included in one integrated chip (IC) or IC package according to an embodiment. For example, at least some (for example, the communication processor corresponding to the cellular module 2321 and the Wi-Fi processor corresponding to the Wi-Fi module 2323) of processors corresponding to the cellular module 2321, the Wi-Fi module 2323, the BT module 2325, the GPS module 2327, and the NFC module 2328 may be implemented as one SoC.

The RF module 2329 may transmit and receive data, for example, RF signals. The RF module 2329 may include, for example, a transceiver, a Power Amp Module (PAM), a frequency filter, a Low Noise Amplifier (LNA), or the like, although this is not illustrated. Further, the RF module 2329 may further include a component for transmitting and receiving an electromagnetic wave in the free airspace in wireless communication, for example, a conductor or a conductive wire. Although the cellular module 2321, the Wi-Fi module 2323, the BT module 2325, the GPS module 2327, and the NFC module 2328 are illustrated to share one RF module 2329 in FIG. 23, at least one of the cellular module 2321, the Wi-Fi module 2323, the BT module 2325, the GPS module 2327, and the NFC module 2328 may transmit/receive the RF signal through a separate RF module according to an embodiment of the present invention.

According to an exemplary embodiment, the RF module 2329 may include at least one antenna between a main antenna and a sub antenna functionally connected with the electronic device 2300. The communication module 2320 may support Multiple Input Multiple Output (MIMO) services, such as diversity, by using the main antenna and the sub antenna.

The SIM card 2324 may be a card that includes a subscriber identification module and may be inserted into a slot formed in a predetermined location of the electronic device. The SIM card 2324 may include unique identification information (e.g., an integrated circuit card identifier (ICCID)) or subscriber information (e.g., an international mobile subscriber identity (IMSI)).

The memory 2330 may include an internal memory 2332 or an external memory 2334. The internal memory 2332 may include at least one of a volatile memory (e.g., a dynamic random access memory (DRAM), a static RAM (SRAM), a synchronous dynamic RAM (SDRAM), and the like) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, a NOR flash memory, and the like).

According to an embodiment, the internal memory 2332 may be a Solid State Drive (SSD). The external memory 2334 may further include a flash drive, for example, a compact flash (CF), a secure digital (SD), a micro secure digital (Micro-SD), a mini secure digital (Mini-SD), an extreme digital (xD), a Memory Stick, or the like. The external memory 2334 may be functionally connected to the electronic device 2300 through various interfaces. According to an embodiment, the electronic device 2300 may further include a storage device (or storage medium) such as a hard disk drive.

The sensor module 2340 may measure a physical quantity or sense an operational state of the electronic device 2300 and may convert the measured or sensed information to an electric signal. The sensor module 2340 may include at least one of, for example, a gesture sensor 2340A, a gyro sensor 2340B, an atmospheric pressure sensor 2340C, a magnetic sensor 2340D, an acceleration sensor 2340E, a grip sensor 2340F, a proximity sensor 2340G, a color sensor 2340H (for example, a Red/Green/Blue (RGB) sensor), a biometric sensor 2340I, a temperature/humidity sensor 2340J, an illumination sensor 2340K, and an Ultra Violet (UV) sensor 2340M. Additionally or alternatively, the sensor module 2340 may, for example, include an E-nose sensor (not shown), an electromyography (EMG) sensor (not shown), an electroencephalogram (EEG) sensor (not shown), an electrocardiogram (ECG) sensor (not shown), an Infrared (IR) sensor (not shown), an iris sensor (not shown), a fingerprint sensor (not shown), and the like. The sensor module 2340 may further include a control circuit for controlling one or more sensors included therein.

The input device 2350 may include a touch panel 2352, a (digital) pen sensor 2354, a key 2356, or an ultrasonic input device 2358. The touch panel 2352 may recognize a touch input in at least one of, for example, a capacitive type, a resistive type, an infrared type, and an ultrasonic wave type. Furthermore, the touch panel 2352 may further include a control circuit. In the case of the capacitive type, physical contact or proximity recognition is possible. The touch panel 2352 may further include a tactile layer. In this case, the touch panel 2352 may provide a tactile reaction to a user.

The (digital) pen sensor 2354 may be embodied, for example, using a method identical or similar to a method of receiving a touch input of a user, or using a separate recognition sheet. The key 2356 may include, for example, a physical button, an optical key, or a keypad. The ultrasonic input device 2358 is a device which can identify data by sensing a micro wave in the electronic device 2300 through an input tool for generating an ultrasonic signal, and wireless recognition is possible. According to an embodiment, the electronic device 2300 may also receive a user input from an external device (e.g., a computer or server) connected thereto using the communication module 2320.

The display 2360 (for example, the display 550) may include a panel 2362, a hologram device 2364 or a projector 2366. For example, the panel 2362 may be, for example, a Liquid Crystal Display (LCD), an active matrix organic light emitting diode (AM-OLED), or the like. The panel 2362 may be implemented to be, for example, flexible, transparent, or wearable. The panel 2362, together with the touch panel 2352, may be implemented as one module. The hologram device 2364 may show a three dimensional image in the air by using an interference of light. The projector 2366 may display an image by projecting light onto a screen. The screen may be located, for example, in the interior of, or on the exterior of, the electronic device 2300. According to an embodiment, the display 2360 may further include a control circuit for controlling the panel 2362, the hologram device 2364, or the projector 2366.

The interface 2370 may include, for example, a high-definition multimedia interface (HDMI) 2372, a universal serial bus (USB) 2374, an optical interface 2376, and a D-subminiature (D-sub) 2378. Additionally or alternatively, the interface 2370 may, for example, include a mobile high-definition link (MHL) interface, a secure digital (SD) card/multi-media card (MMC) interface, or an infrared data association (IrDA) interface.

The audio module 2380 may convert a sound and an electrical signal, and vice versa. The audio module 2380 may process sound information that is input or output through, for example, a speaker 2382, a receiver 2384, earphones 2386, the microphone 2388, etc.

The image sensor module 2391 (for example, the image sensor module 560) is a device that can take still and moving images, and according to an exemplary embodiment, may include one or more image sensors (for example, a front sensor or a rear sensor, not shown), a lens (not shown), an image signal processor (ISP) (not shown), or a flash (for example, an LED or a xenon lamp, not shown).

The power management module 2395 may manage power of the electronic device 2300. Although not illustrated, the power management module 2395 may include, for example, a power management integrated circuit (PMIC), a charger integrated circuit (IC), or a battery or fuel gauge.

The PMIC may be mounted within, for example, an integrated circuit or an SoC semiconductor. The charging methods may be classified into wired charging and wireless charging. The charger IC may charge a battery and may prevent an overvoltage or excess current from being induced or flowing from a charger. According to an embodiment, the charger IC may include a charger IC for at least one of the wired charging and the wireless charging. Examples of the wireless charging may include magnetic resonance charging, magnetic induction charging, and electromagnetic charging, and an additional circuit such as a coil loop, a resonance circuit, a rectifier or the like may be added for the wireless charging.

The battery gauge may measure, for example, a residual quantity of the battery 2396, and a voltage, a current, or a temperature while charging. The battery 2396 may store or generate electricity, and may supply power to the electronic device 2300 by using the stored or generated electricity. The battery 2396 may include, for example, a rechargeable battery or a solar battery.

The indicator 2397 may display a specific state, such as a booting state, a message state, a charging state, of the electronic device 2300 or a part of the electronic device 2300 (for example, the AP 2310). The motor 2398 may convert an electrical signal into a mechanical vibration. Although not illustrated, the electronic device 2300 may include a processing unit (for example, a GPU) for supporting mobile TV. The processing unit for supporting mobile TV may process, for example, media data pursuant to a certain standard of Digital Multimedia Broadcasting (DMB), Digital Video Broadcasting (DVB), or media flow.

Each of the above described elements of the electronic device according to various embodiments of the present invention may be formed of one or more components, and the name of a corresponding element may vary according to the type of an electronic device. The electronic device according to various embodiments of the present invention may include at least one of the above described elements and may exclude some of the elements or further include other additional elements. Further, some of the elements of the electronic device according to various embodiments of the present invention may be coupled to form a single entity while performing the same functions as those of the corresponding elements before the coupling.

Figure 24:
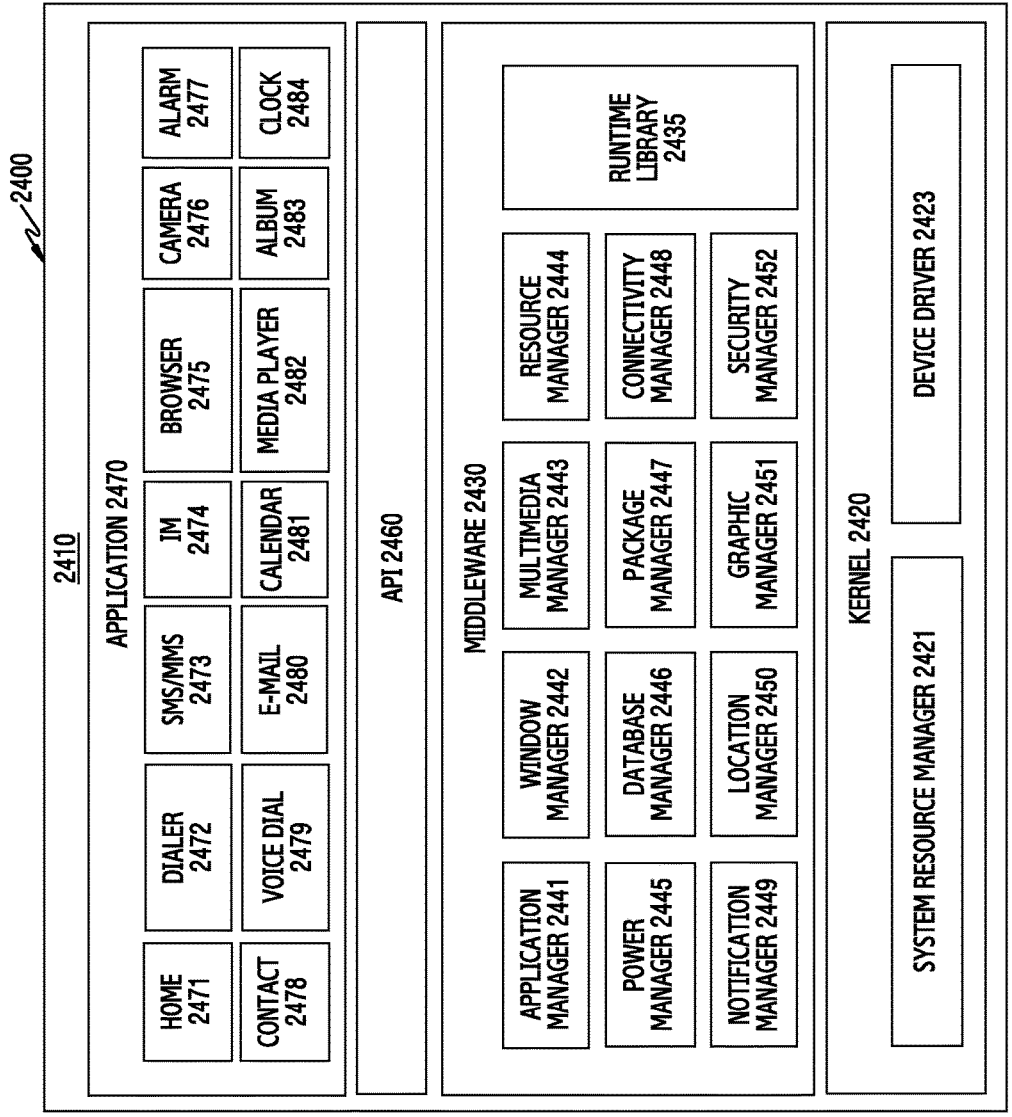
FIG. 24 is a block diagram of a program module according to various embodiments of the present invention.

FIG. 24 is a block diagram of a program module according to various embodiments of the present invention.

According to an embodiment, the program module 2410 (e.g., the program of FIG. 5) may include an Operating System (OS) that controls resources relating to an electronic device (e.g., the electronic device 500) and/or various applications (e.g., the application programs 534) that are driven on the operating system. The operating system may be, for example, Android™, iOS™, Windows™, Symbian™, Tizen™, Bada™, and the like.

The program module 2410 may include a kernel 2420, middle ware 2430, an API 2460, and/or applications 2470. At least some of the program module 2410 may be preloaded in the electronic device or downloaded from a server.

The kernel 2420 (e.g., the kernel 531 of FIG. 5) may include, for example, a system resource manager 2421 or a device driver 2423. The system resource manager 2421 may control, allocate, or retrieve system resources. According to an embodiment, the system resource manager 2421 may include a process manager, a memory manager, or a file system manager. The device driver 2423 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 2430 may provide a function required by the applications 2470 in common or provide various functions to the applications 2470 through the API 2460 so that the applications 2470 can efficiently use limited system resources within the electronic device. According to an embodiment, the middleware 2430 (for example, the middleware 532) may include, for example, at least one of a runtime library 2435, an application manager 2441, a window manager 2442, a multimedia manager 2443, a resource manager 2444, a power manager 2445, a database manager 2446, a package manager 2447, a connectivity manager 2448, a notification manager 2449, a location manager 2450, a graphic manager 2451, and a security manager 2452.

The runtime library 2435 may include, for example, a library module that a compiler uses in order to add a new function through a programming language while the applications 2470 are being executed. The runtime library 2435 may perform input/output management, memory management, the functionality for an arithmetic function, and the like.

The application manager 2441 may manage, for example, the life cycle of at least one of the applications 2470. The window manager 2442 may manage Graphical User Interface (GUI) resources used on a screen. The multimedia manager 2443 may determine formats required to reproduce various media files and may encode or decode a media file using a coder/decoder (codec) appropriate for the corresponding format. The resource manager 2444 may manage resources, such as the source code, the memory, the storage space, and the like of at least one of the applications 2470.

The power manager 2445 may operate together with a Basic Input/Output System (BIOS) to manage a battery or power and may provide power information required for the operation of the electronic device. The database manager 2446 may generate, search for, and/or change a database to be used by at least one of the applications 2470. The package manager 2447 may manage the installation or update of an application that is distributed in the form of a package file.

The connectivity manager 2448 may manage a wireless connection such as, for example, Wi-Fi or Bluetooth. The notification manager 2449 may display or notify of an event, such as an arrival message, an appointment, a proximity notification, etc., in such a manner as not to disturb a user. The location manager 2450 may manage the location information of the electronic device. The graphic manager 2451 may manage a graphic effect to be provided to a user and a user interface relating to the graphic effect. The security manager 2452 may provide various security functions required for system security, user authentication, etc. According to an embodiment, in a case where the electronic device (for example, the electronic device 500) has a telephone call function, the middleware 2430 may further include a telephony manager for managing a voice or video call function of the electronic device.

The middleware 2430 may include a middleware module that forms a combination of various functions of the above-described elements. The middleware 2430 may provide specialized modules according to the types of operating systems in order to provide differentiated functions. Furthermore, the middleware 2430 may dynamically remove some of the existing elements, or may add new elements.

The API 2460 (for example, the API 533) is, for example, a set of API programming functions, and may be provided with different configurations according to operating systems. For example, in the case of Android or iOS, one API set may be provided for each platform, and in the case of Tizen™, two or more API sets may be provided for each platform.

The applications 2470 (e.g., the application programs 534), for example, may include one or more applications that may provide functions such as home 2471, dialer 2472, SMS/MMS 2473, Instant Message (IM) 2474, browser 2475, camera 2476, alarm 2477, contacts 2478, voice dial 2479, e-mail 2480, calendar 2481, media player 2482, album 2483, clock 2484, health care (e.g., measuring exercise quantity or blood sugar), or environment information (e.g., atmospheric pressure, humidity, or temperature information).

According to an embodiment, the applications 2470 may include an application (hereinafter, referred to as an "information exchange application" for convenience of the description) for supporting information exchange between the electronic device (e.g., the electronic device 500) and an external electronic device. The information exchange application may include, for example, a notification relay application for transferring specific information to an external electronic device or a device management application for managing an external electronic device.

For example, the notification relay application may have a function of transferring notification information generated by other applications of the electronic device (e.g., the SMS/MMS application, the e-mail application, the health care application, or the environmental information application) to the external electronic device. Furthermore, the notification relay application may, for example, receive notification information from the external electronic device and may provide the received notification information to a user. The device management application, for example, may manage (e.g., install, delete, or update) at least one function of an external electronic device communicating with the electronic device (e.g., a function of turning on/off the external electronic device itself (or some components thereof) or a function of controlling the luminance (or a resolution) of the display), applications operating in the external electronic device, or services provided by the external electronic device (e.g., a telephone call service and a message service).

According to an embodiment, the applications 2470 may include applications (e.g., a health care application) designated according to the attributes of an external electronic device (e.g., as an attribute of the electronic device, the type of the electronic device is a mobile medicine appliance). According to an embodiment, the application 2470 may include an application received from the external electronic device (e.g., a server or an electronic device). According to an embodiment, the applications 2470 may include pre-loaded applications or third-party applications that can be downloaded from a server. Names of the elements of the program module 2410, according to the above-described embodiments of the present invention, may change depending on the type of OS.

According to various exemplary embodiments of the present invention, at least some of the program module 2410 may be implemented in software, firmware, hardware, or a combination of two or more thereof. At least some of the program module 2410 may be implemented (e.g., executed) by, for example, the processor (e.g., the AP 2310). At least some of the program module 2410 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present invention may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present invention may be implemented by a command stored in a computer-readable storage medium in a programming module form. The instruction, when executed by a processor (e.g., the processor 520), may cause the one or more processors to execute the function corresponding to the instruction. The computer-readable storage medium may be, for example, the memory 530.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present invention, and vice versa.

The programming module according to the present invention may include one or more of the aforementioned components or may further include other additional components, or some of the aforementioned components may be omitted. Operations executed by a module, a programming module, or other component elements according to various embodiments of the present invention may be executed sequentially, in parallel, repeatedly, or in a heuristic manner. Further, some operations may be executed according to another order or may be omitted, or other operations may be added.

Various embodiments disclosed herein are provided merely to easily describe technical details of the present invention and to help the understanding of the present invention, and are not intended to limit the scope of the present invention. Therefore, it should be construed that all modifications and changes or modified and changed forms based on the technical idea of the present invention fall within the scope of the present invention.

The invention claimed is:

1. An electronic device comprising:
an image sensor configured to obtain at least one image;
a light emitting module configured to emit infrared light; and
a processor configured to:
in response to receiving a request for authentication, identify iris recognition environment information using input information of the electronic device,
change at least one iris recognition parameter based on the iris recognition environment information,
control the light emitting module to emit infrared light based on the changed iris recognition parameter, and
perform iris recognition using the image obtained through the image sensor module.

2. The device of claim 1, wherein the processor is configured to determine the iris recognition environment information using at least one of illuminance collected through the image sensor module, a shutter speed of the image sensor module, and a sensor sensitivity of the image sensor module, and
wherein the iris recognition environment information comprises information indicative of an indoor or outdoor environment.

3. The device of claim 1, further comprising at least one sensor configured to sense illuminance, wherein the processor is configured to determine the iris recognition environment information using illuminance collected through the at least one sensor or the image sensor module, and
wherein the iris recognition environment information comprises information indicative of an indoor or outdoor environment.

4. The device of claim 1, wherein the processor is configured to change at least one iris recognition parameter of an exposure time of the image sensor module, a light emission time of the light emitting module, a light emission intensity of the light emitting module, or an emission scheme of the light emitting module, based on the iris recognition environment information, and
wherein the infrared light emission scheme comprises at least one of a continuous wave scheme and a pulse scheme.

5. The device of claim 4, wherein, in a case of an outdoor environment, the processor is configured to set the exposure time of the image sensor module to be relatively shorter than in an indoor environment, and set the light emission time of the light emitting module to be relatively longer than in the indoor environment, and
wherein, in a case of the indoor environment, the processor is configured to set the exposure time of the image sensor module to be relatively longer than in the outdoor environment, and set the light emission time of the light emitting module to be relatively shorter than in the outdoor environment.

6. The device of claim 1, further comprising at least one sensor configured to estimate a distance between the electronic device and a user,
wherein the processor is configured to adjust a light emission amount of the light emitting module based on the distance between the electronic device and the user, which is estimated using the at least one sensor or the image sensor module, and the light emission amount of the light emitting module comprises at least one of a light emission time and a light emission intensity of the light emitting module.

7. The device of claim 6, wherein, in response to adjusting the light emission amount of the light emitting module, the processor is configured to adjust the sensitivity of the image sensor module to correspond to the light emission intensity of the light emitting module.

8. The device of claim 6, wherein the at least one sensor includes at least one of a proximity sensor, an illumination sensor, a distance measurement sensor of a Time Of Flight (TOF) scheme, and a depth sensor.

9. The device of claim 1, wherein the processor is configured to identify a position of an iris image in the image obtained through the image sensor module, and adjust a light emission intensity of the light emitting module to correspond to the position of the iris image.

10. A method of an electronic device, comprising:
in response to receiving a request for authentication, identifying iris recognition environment information using at least one input information of the electronic device;
changing at least one iris recognition parameter based on the iris recognition environment information;
emitting infrared light based on the changed iris recognition parameter; and
performing iris recognition using an image obtained through an image sensor module.

11. The method of claim 10, wherein the identifying the iris recognition environment information comprises:
identifying illuminance through at least one sensor configured to sense illuminance or the image sensor module; and
determining an indoor or outdoor environment in which the electronic device is located, using the identified illuminance.

12. The method of claim 10, wherein the changing the iris recognition parameter comprises changing at least one iris recognition parameter of an exposure time of the image sensor module, an infrared light emission time, an infrared light emission intensity, and an infrared light emission scheme, based on the iris recognition environment information, and
wherein the infrared light emitting scheme comprises at least one of a continuous wave scheme and a pulse scheme.

13. The method of claim 12, wherein the changing the iris recognition parameter comprises: in a case of an outdoor environment, setting the exposure time of the image sensor module to be relatively shorter than in an indoor environment and setting the light emission time of the light emitting module to be relatively longer than in the indoor environment; and
in a case of the indoor environment, setting the exposure time of the image sensor module to be relatively longer than in the outdoor environment and setting the light emission time of the light emitting module to be relatively shorter than in the outdoor environment.

14. The method of claim 10, further comprising:
estimating a distance between the electronic device and a user; and
adjusting an emission amount of infrared light based on the distance between the electronic device and the user, wherein the emission amount of infrared light comprises at least one of an infrared light emission time and an infrared light emission intensity.

15. The method of claim 14, further comprising:
in response to adjusting the light emission amount of the light emitting module, adjusting the sensitivity of the image sensor module to correspond to the light emission intensity of the light emitting module.

16. The method of claim 14, wherein the estimating the distance between the electronic device and the user comprises: estimating the distance between the electronic device and the user using at least one of a proximity sensor, an illumination sensor, a distance measurement sensor of a Time Of Flight (TOF) scheme, and a depth sensor.

17. The method of claim 10, further comprising:
identifying a position of an iris image in the image obtained through the image sensor module; and
adjusting an infrared light emission intensity to correspond to the position of the iris image.

18. The method of claim 10, wherein the identifying the iris recognition environment information comprises: determining the iris recognition environment information using at least one of illuminance collected through the image sensor module, a shutter speed of the image sensor module, and a sensor sensitivity of the image sensor module, and
wherein the iris recognition environment information comprises information indicative of an indoor or outdoor environment.

* * * * *